(12) United States Patent
Ishizuka et al.

(10) Patent No.: US 12,388,762 B2
(45) Date of Patent: Aug. 12, 2025

(54) MANAGEMENT APPARATUS AND NETWORK SYSTEM

(71) Applicant: NTT DOCOMO, INC., Chiyoda-ku (JP)

(72) Inventors: Hiroki Ishizuka, Chiyoda-ku (JP); Masashi Anzawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 222 days.

(21) Appl. No.: 17/905,464

(22) PCT Filed: Feb. 26, 2021

(86) PCT No.: PCT/JP2021/007378
§ 371 (c)(1),
(2) Date: Sep. 1, 2022

(87) PCT Pub. No.: WO2021/177174
PCT Pub. Date: Sep. 10, 2021

(65) Prior Publication Data
US 2023/0208767 A1    Jun. 29, 2023

(30) Foreign Application Priority Data
Mar. 4, 2020   (JP) .................................. 2020-036753

(51) Int. Cl.
*H04L 47/2475* (2022.01)
(52) U.S. Cl.
CPC .............................. *H04L 47/2475* (2013.01)

(58) Field of Classification Search
CPC .................................................. H04L 47/2475
See application file for complete search history.

(56) References Cited

U.S. PATENT DOCUMENTS

| 8,406,235 | B2 * | 3/2013 | Walton .................. H04L 47/245 |
| | | | 370/395.43 |
| 9,350,624 | B2 * | 5/2016 | Shakhmetov ........... H04L 47/70 |
| 2010/0020681 | A1 | 1/2010 | Nakashima et al. |

(Continued)

FOREIGN PATENT DOCUMENTS

| CN | 110602733 A | 12/2019 |
| JP | 2011-155600 A | 8/2011 |

(Continued)

OTHER PUBLICATIONS

International Search Report mailed on Jun. 1, 2021 in PCT/JP2021/007378 filed on Feb. 26, 2021 (4 pages).

(Continued)

*Primary Examiner* — Nazia Naoreen
(74) *Attorney, Agent, or Firm* — Oblon, McClelland, Maier & Neustadt, L.L.P.

(57) ABSTRACT

A management apparatus includes: a determiner configured to determine whether at least one application program is in operation in a specific state at a terminal apparatus connected to a network NW, the at least one application program being a target for control of a quality of service for communication in the network; and a termination processor configured to execute processing to terminate the control of the quality of the service for the terminal apparatus based on a determination result by the determiner being negative.

9 Claims, 10 Drawing Sheets

(56) References Cited

U.S. PATENT DOCUMENTS

| | | | | |
|---|---|---|---|---|
| 2011/0185052 A1* | 7/2011 | Nakahira | .............. | H04L 41/083 |
| | | | | 709/223 |
| 2015/0092673 A1* | 4/2015 | Singh | ................ | H04W 72/1215 |
| | | | | 370/329 |
| 2016/0094464 A1* | 3/2016 | Talat | ....................... | H04L 65/61 |
| | | | | 709/219 |
| 2016/0226703 A1* | 8/2016 | Grinshpun | .......... | H04L 47/2441 |
| 2018/0337887 A1* | 11/2018 | Aluvala | .............. | H04L 47/2433 |

FOREIGN PATENT DOCUMENTS

| | | |
|---|---|---|
| JP | 2012-222380 A | 11/2012 |
| JP | 2017-98962 A | 6/2017 |
| WO | WO 2008/004592 A1 | 1/2008 |

OTHER PUBLICATIONS

Notice of Reasons for Refusal issued Jun. 6, 2023 in Japanese Patent Application No. 2022-505181 (with English machine translation), 8 pages.

Japanese Office Action issued Oct. 17, 2023 in Japanese Application 2022-505181, (with unedited computer-generated English translation), 7 pages.

* cited by examiner

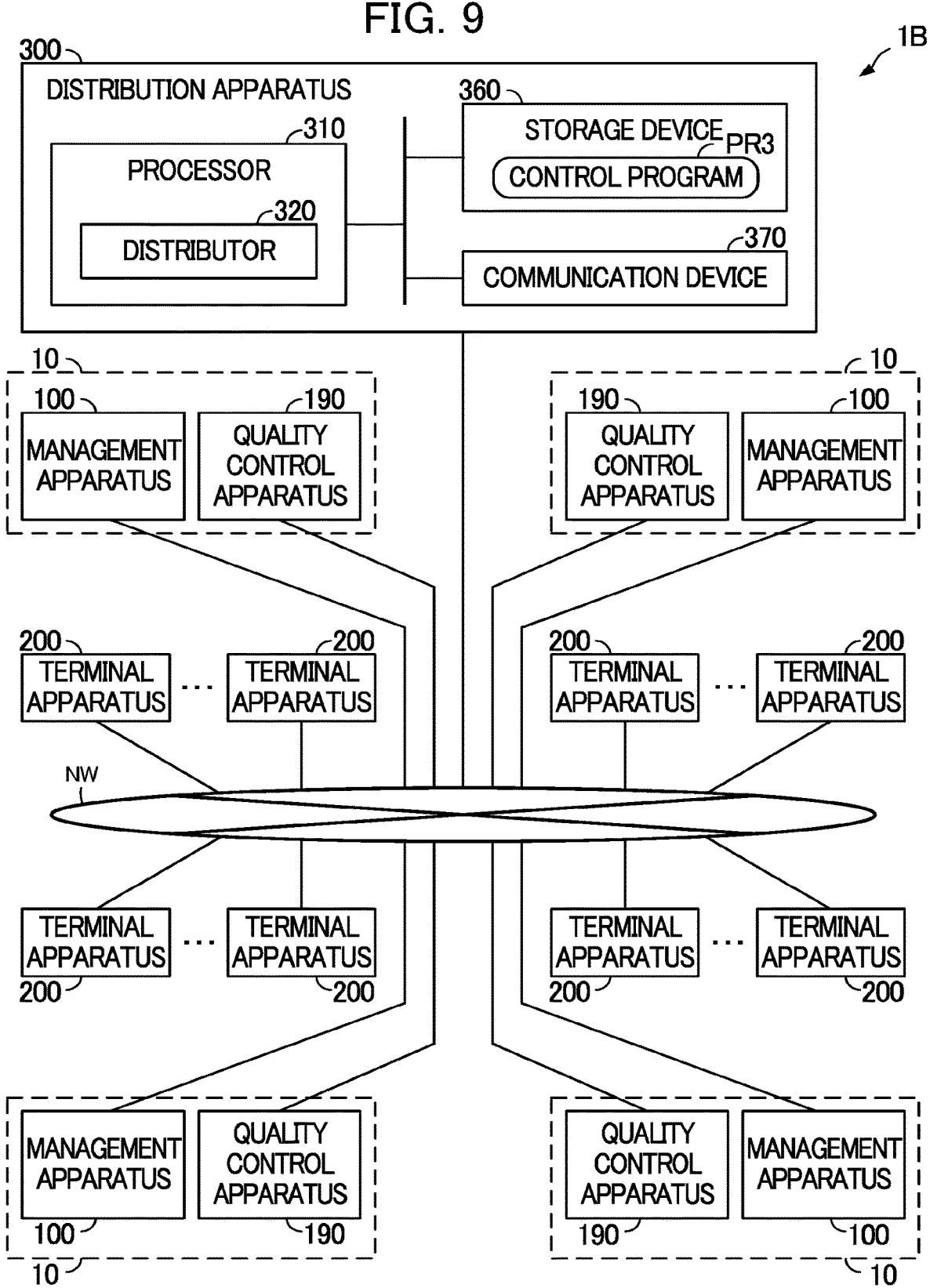

MANAGEMENT APPARATUS AND NETWORK SYSTEM

TECHNICAL FIELD

The invention relates to a management apparatus and to a network system.

BACKGROUND ART

Control of quality of service (QOS) is known as a technique for ensuring quality of communication in a network. For example, a system is disclosed that executes control (QOS control) of the transfer order and transfer rate of packets flowing on a network for each terminal apparatus such as a smartphone, etc. (for example, Patent Document 1). In this type of system, for example, management software that is software installed in a terminal apparatus determines an application program, which realizes a function actively displayed on a front image among display images on the terminal apparatus, as an active application program. The QoS control is then executed based on the type of active application program determined by the management software.

RELATED ART DOCUMENT

Patent Document

Patent Document 1: Japanese Patent Application Laid-Open Publication No. 2017-098962

SUMMARY OF THE INVENTION

Problem to be Solved by the Invention

To use QoS control, an application business operator providing an application program may pay a usage fee for the QoS control to a carrier providing the QoS control. In this case, it is desirable that the QoS control not be executed for an application program for which the usage fee for the QoS control has not been paid (i.e., an application program that is not permitted to use the QoS control). However, in a system in which the QoS control is executed for each unit, for example, for each terminal apparatus, for each subscriber identity module (SIM), for each communication line, for each bearer, for each packet data network (PDN), for each access point name (APN), and for each data network name (DNN), etc., the QoS control may be executed for the application program that is not permitted to use the QoS control.

Means for Solving the Problem

To solve the above problem, a management apparatus according to a preferred mode of the invention includes a determiner configured to determine whether at least one application program is in operation in a specific state at a terminal apparatus connected to a network, the at least one application program being a target for control of a quality of service for communication in the network; and a termination processor configured to execute processing to terminate control of the quality of the service for the terminal apparatus based on a result of determination by the determiner being negative.

Effects of the Invention

According to the present invention, it is possible to reduce execution of QoS control for an application program that is not permitted to use the QoS control.

BRIEF DESCRIPTION OF THE DRAWINGS

FIG. 9 is a block diagram showing an overall configuration of the network system according to a third modification.

MODES FOR CARRYING OUT THE INVENTION

1. First Embodiment

Figure 1A:
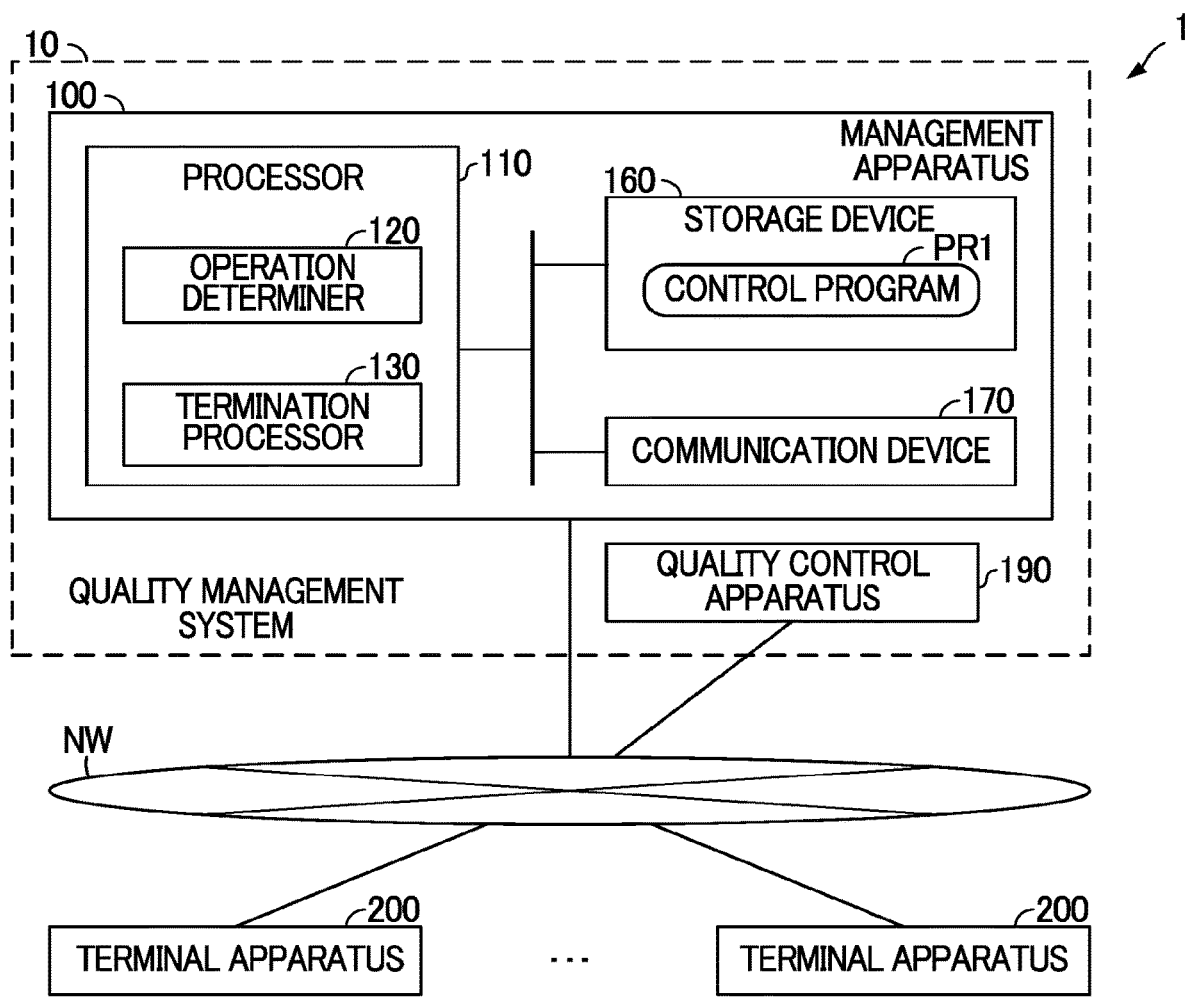
FIG. 1A is a block diagram showing an overall configuration of a network system including a management apparatus according to a first embodiment.
Figure 1B:
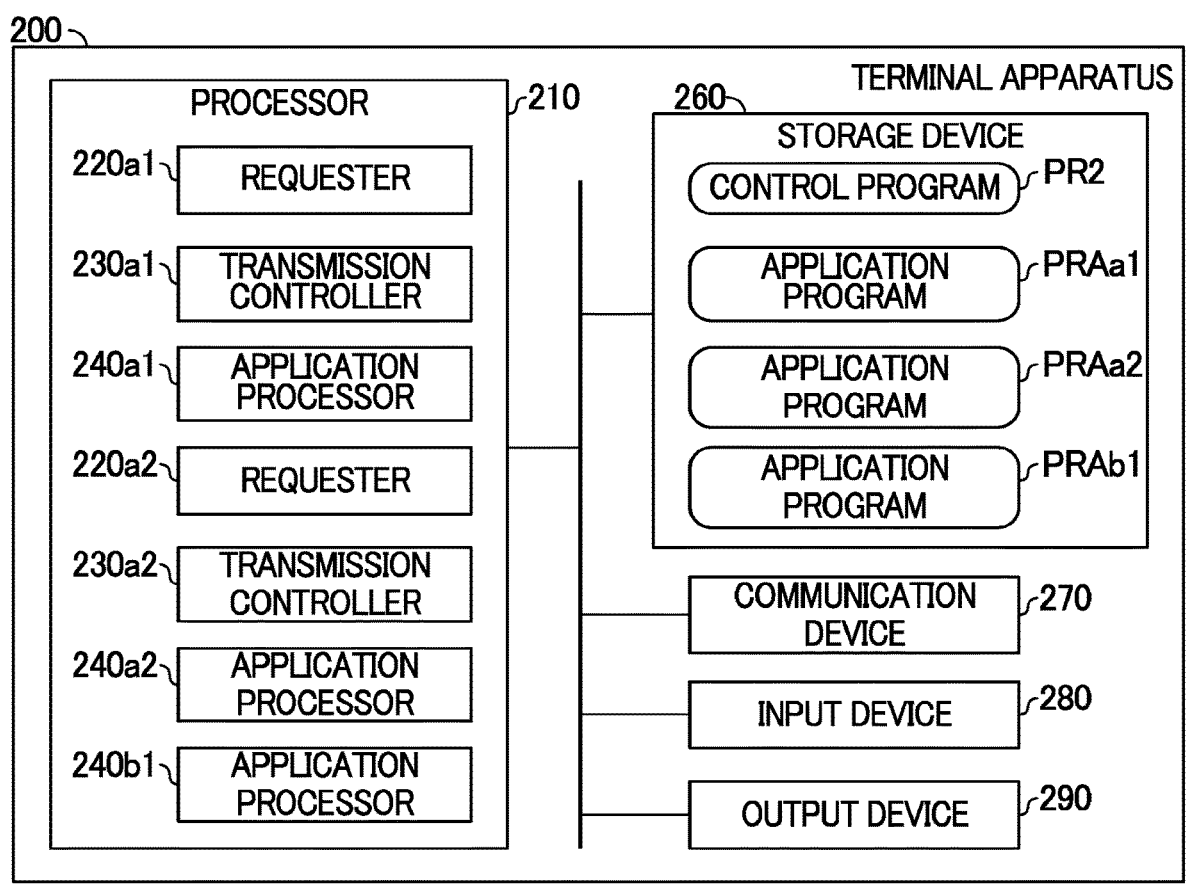
FIG. 1B is a block diagram showing an example of a configuration of a terminal apparatus shown in FIG. 1A.

FIG. 1A is a block diagram showing an overall configuration of a network system 1 including a management apparatus 100 according to a first embodiment. In addition, FIG. 1B is a block diagram showing an example of a configuration of a terminal apparatus 200 shown in FIG. 1A. In the following, FIG. 1A and FIG. 1B may be generally referred to as FIG. 1. As shown in FIG. 1A, the network system 1 includes a quality management system 10, a plurality of terminal apparatuses 200, and a network NW. For example, a terminal apparatus 200 may be a freely selected information processing apparatus, a stationary information apparatus such as a personal computer, etc., or a mobile information terminal apparatus such as a smartphone, a notebook computer, a wearable terminal apparatus, and a tablet terminal apparatus, etc. In the following description, it is assumed that the terminal apparatus 200 is a smartphone. The network NW is a telecommunication line, such as a mobile communication network, etc., and the network NW includes one or both of a wired network and a wireless network. The quality management system 10 and the terminal apparatus 200 are communicable with each other via the network NW.

The quality management system 10 includes a quality control apparatus 190 capable of controlling a quality of service for communication in the network NW connected to the plurality of terminal apparatuses 200 for each terminal apparatus 200, and the management apparatus 100. The quality control apparatus 190 is an example of an external system for the management apparatus 100. In the following, the control of the quality of the service is referred to as quality of service (QOS) control. The QoS control includes, for example, bandwidth control, low latency control, and priority control, etc. In the bandwidth control, for example, the bandwidth of communication in the network NW is controlled. The bandwidth control may be a bandwidth guarantee in which a lower limit of a bandwidth is set, and the bandwidth control may be a bandwidth limit in which an upper limit of a bandwidth is set. Similarly, the low latency control may be, for example, a delay guarantee in which an upper limit of latency is set, and the low latency control may be a delay limit in which a lower limit of the latency is set. In the priority control, for example, a packet related to a specific communication (a unit of data transferred for communication) are transferred as a priority. For example, packets flowing on the network NW are each assigned a priority level, and packets with a higher priority level are processed before other packets.

The quality control apparatus 190 is, for example, an information processing apparatus such as a server, etc., and the quality control apparatus 190 executes the QoS control. For example, based on receipt of a QoS start request REQs for a start of the QoS control from the terminal apparatus 200, the quality control apparatus 190 executes the QoS control on communication executed by the terminal apparatus 200 at the QoS level specified by the QoS start request REQs from the terminal apparatus 200 (see, for example, FIG. 2). The QoS level includes, for example, a large-capacity mode in which a large amount of data can be transferred compared to other modes, a low-latency mode in which a latency of data is small compared to other modes, and a best-effort mode in which the control base on a best-effort is executed, etc. The quality control apparatus 190 is communicable with the management apparatus 100. In addition to being specified by the terminal apparatus 200, the QoS level may be specified, for example, by a server such as the management apparatus 100, etc., or by an apparatus (not shown) included in the network NW.

In this embodiment, a case is assumed in which the QoS start request REQs is transmitted from a terminal apparatus 200, at which an application program PRA that is permitted to use the QoS control is in operation in a specific state, among the terminal apparatuses 200 connected to the network NW. The specific state is, for example, a state in which the QoS control should be executed. Specifically, the specific state may be, for example, a state (foreground) in which an image generated by the execution of the application program PRA is actively displayed as a front image from among display images on the terminal apparatus 200. The specific state is not limited to the foreground. For example, the specific state may be a state in which specific processing such as sound output, etc., is executed. In addition, for example, the specific state may be a state in which a specific application program PRA that is permitted by a carrier, etc., or a specific application program PRA related to safety and security is being executed in the foreground or in the background.

In the following, an application program PRA that is permitted to use the QoS control from among application programs PRA that can be installed on the terminal apparatus 200 may be referred to as a "permitted application program PRAa (PRAa1 and PRAa2)." In addition, an application program PRA that is not permitted to use the QoS control may be referred to as an "unpermitted application program PRAb (PRAb1)" in contrast to the permitted application program PRAa.

To use the QoS control, an application business operator providing the application program PRA may pay a usage fee for the QoS control to a carrier providing the QoS control, for example. For example, by paying the usage fee for the QoS control, the application business operator is allowed to incorporate QoS control software development kit (SDK), which is required to use the QoS control, into the application program PRA. In this case, an application program PRA for which the usage fee for the QoS control has been paid (for example, an application program PRA with the QoS control SDK) corresponds to the permitted application program PRAa. In addition, an application program PRA for which the usage fee for the QoS control has not been paid (for example, an application program PRA with no QoS control SDK) corresponds to the unpermitted application program PRAb. Note that the permitted application program PRAa may be realized by a method different from the method of incorporating the QoS control SDK. Whether the permitted application program PRAa is in operation in the specific state is determined by the management apparatus 100.

The management apparatus 100 is, for example, an information processing apparatus such as a server, etc., and the management apparatus 100 is communicable with the plurality of terminal apparatuses 200 connected to the network NW. The management apparatus 100 may be communicable with only a terminal apparatus 200, on which the permitted application program PRAa is installed, from among the terminal apparatuses 200 connected to the network NW.

The management apparatus 100 is, for example, realized by a computer system including a processor 110, a storage device 160, and a communication device 170. Multiple elements of the management apparatus 100 are interconnected by a single bus or by multiple buses for communicating information. The term "device" in this specification may be understood as another term such as a circuit, a device, or a unit, etc. Each of the multiple elements of the management apparatus 100 may be constituted by a single device or by multiple devices. Alternatively, some elements of the management apparatus 100 may be omitted.

The processor 110 is a processor configured to control the entire management apparatus 100, and the processor 110 includes, for example, a single or multiple chips. The processor 110 includes a central processing unit (CPU) including, for example, interfaces for peripheral devices, arithmetic units, and registers, etc. Some or all of the functions of the processor 110 may be realized by hardware such as a digital signal processor (DSP), an application specific integrated circuit (ASIC), a programmable logic device (PLD), and a field programmable gate array (FPGA), etc. The processor 110 executes various processing in parallel or sequentially.

The processor 110, for example, reads a control program PR1 from the storage device 160, and the processor 110 executes the read control program PR1 to function as an operation determiner 120 and a termination processor 130. The control program PR1 may be transmitted from another device via the network NW. The operation determiner 120 is an example of a determiner.

The operation determiner 120, for example, determines whether at least one application program PRA (that is, the permitted application program PRAa), which is a target for control of a quality of service (QOS control) for communication in the network NW, is in operation in the specific state at the terminal apparatus 200 connected to the network NW. Details of an operation of the operation determiner 120 are described with reference to FIG. 3, described later.

The termination processor 130 requests the quality control apparatus 190 to terminate the QoS control for the terminal apparatus 200 based on a result of determination by the operation determiner 120 being negative, in other words, based on the permitted application program PRAa not being in operation in the specific state. Requesting the quality control apparatus 190 to terminate the QoS control for the terminal apparatus 200 corresponds to executing processing to terminate the QoS control for the terminal apparatus 200. The QoS control for the terminal apparatus 200 means, for example, QoS control requested to the quality control apparatus 190 by the terminal apparatus 200. Details of an operation of the termination processor 130 are described with reference to FIG. 3 described later.

The storage device 160 is a recording medium readable by the processor 110, and the storage device 160 is configured to store various data such as a plurality of programs including the control program PR1 to be executed by the processor 110. The storage device 160 may include, for example, at least one of a read only memory (ROM), an erasable programmable ROM (EPROM), an electrically erasable programmable ROM (EEPROM), and a random access memory (RAM), etc. The storage device 160 may be referred to as a register, a cache, or a main memory (main storage device), etc.

The communication device 170 is hardware (transmitter/receiver device) for communicating with other devices via the network NW. The communication device 170 may be referred as, for example, a network device, a network controller, a network card, or a communication module, etc. The communication device 170 may be include a high-frequency switch, a duplexer, a filter, and a frequency synthesizer, etc., to realize one or both of a frequency division duplex (FDD) and a time division duplex (TDD), for example.

Although FIG. 1A does not show a configuration of the quality control apparatus 190 specifically, the quality control apparatus 190 is, for example, realized by a computer system including a processor configured to control the entire quality control apparatus 190, a storage device configured to store various data, and a communication device for communicating with other devices via the network NW, as in the management apparatus 100. The function of the quality control apparatus 190 (function to execute the QoS control) may be realized by the management apparatus 100. In other words, the quality management system 10 may be implemented by a single apparatus (for example, the management apparatus 100 with a function to execute the QoS control), or may be implemented by a plurality of apparatuses (for example, the management apparatus 100 and the quality control apparatus 190) separate from each other.

As shown in FIG. 1B, the terminal apparatus 200 is, for example, realized by a computer system including a processor 210, a storage device 260, a communication device 270, an input device 280, and an output device 290. The processor 210 is a processor configured to control the entire terminal apparatus 200, and the processor 210 includes a configuration that is the same as a configuration of the processor 110 of the management apparatus 100 described above. For example, the processor 210 reads a control program PR2 from the storage device 260, and the processor 210 executes the read control program PR2 to function as a controller (not shown) configured to control the entire terminal apparatus 200.

In addition, the processor 210 reads the application program PRA from the storage device 260, and the processor 210 executes the read application program PRA to function as an application processor 240, etc.

For example, the processor 210 executes a permitted application program PRAa1 to function as a requester 220a1, a transmission controller 230a1, and an application processor 240a1. In addition, the processor 210 executes a permitted application program PRAa2 to function as a requester 220a2, a transmission controller 230a2, and an application processor 240a2. In addition, the processor 210 executes an unpermitted application program PRAb1 to function as an application processor 240b1.

The processor 210 may execute the application program PRA (PRAa1, PRAa2, and PRAb1) in parallel with the control program PR2. The processor 210 may execute the permitted application program PRAa1, the permitted application program PRAa2, and the unpermitted application program PRAb1 in parallel with each other or sequentially. Note that the control program PR2 and the application program PRA may be transmitted from another device via the network NW.

The application processor 240 (240a1, 240a2, and 240b1) is realized, as an original function, by executing the application program PRA (PRAa1, PRAa2, and PRAb1), regardless of whether the use of the QoS control is permitted. The requester 220 (220a1 and 220a2) and the transmission controller 230 (230a1 and 230a2) are realized, as functions, by executing the permitted application program PRAa.

Figure 2:
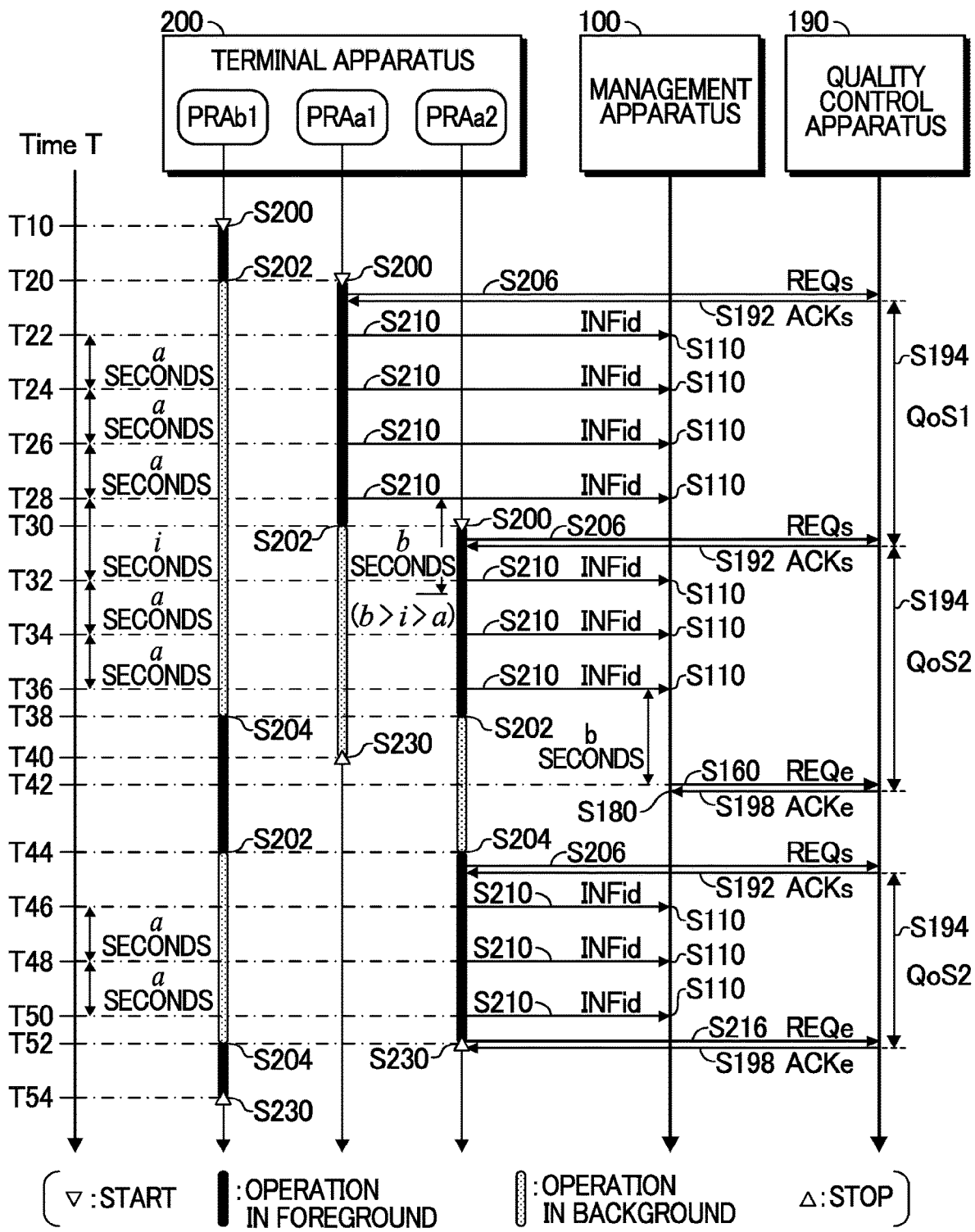
FIG. 2 is a sequence chart showing an example of an operation of the network system shown in FIG. 1A.

For example, the requester 220 transmits the QoS start request REQs for the start of the QoS control to the quality control apparatus 190 based on a start of the permitted application program PRAa, and the requester 220 transmits a QoS termination request REQe for a termination of the QoS control to the quality control apparatus 190 based on a stop of the permitted application program PRAa (see FIG. 2). In other words, the requester 220 requests the quality management system 10 to start the QoS control based on the start of the permitted application program PRAa, and the requester 220 requests the quality management system 10 to terminate the QoS control based on the stop of the permitted application program PRAa. The request for the start of the QoS control may be a call to an application programming interface (API) for the start of the QoS control. Similarly, the request for the termination of the QoS control may be a call to an API for the termination of the QOS control. The source of each of the request for the start of the QoS control for the terminal apparatus 200 and the request for the termination of the QoS control for the terminal apparatus 200 is not limited to the terminal apparatus 200. For example, a server such as the management apparatus 100, or a device (not shown) in the network NW may request each of the start and termination of the QoS control for the terminal apparatus 200.

The transmission controller 230 transmits terminal information INFid for identifying the terminal apparatus 200, at a (a is a positive value) seconds intervals, to the management apparatus 100 in a case in which the permitted application program PRAa is in operation in the specific state at the terminal apparatus 200 (see FIG. 2), for example. The "a seconds intervals" belong to an example of predetermined intervals. In other words, the transmission controller 230 transmits the terminal information INFid at predetermined intervals to the quality management system 10 in a period of time in which an operating state of the permitted application program PRAa is the specific state. The transmission of the terminal information INFid may be, for example, execution of a ping command. The transmission controller 230 may transmit the terminal information INFid in response to a query (for example, a query for confirming whether the permitted application program PRAa is in operation in the specific state) from the management apparatus 100. In this case, the intervals of transmission of the terminal information INFid from the transmission controller 230 to the management apparatus 100 may not be fixed intervals (predetermined intervals).

In this embodiment, the terminal information INFid is not transmitted to the management apparatus 100 when none of the permitted application programs PRAa is in operation in the specific state. In other words, when none of the permitted application programs PRAa is in operation in the specific state, the transmission of the terminal information INFid from the terminal apparatus 200 to the management apparatus 100 stops. Therefore, based on the transmission of the terminal information INFid from the terminal apparatus 200 having stopped, the operation determiner 120 of the management apparatus 100 is capable of determining that none of the permitted application programs PRAa is in operation in the specific state.

The storage device 260 is a recording medium readable by the processor 210, and the storage device 260 is configured to store various data such as a plurality of programs including the control program PR2 and the application programs PRA to be executed by the processor 210. The storage device 260, as in the storage device 160 described above, may include, for example, at least one of a ROM, an EPROM, an EEPROM, and a RAM, etc.

The number of permitted application programs PRAa stored in the storage device 260 is not limited to an example shown in FIG. 1B. For example, the number of permitted application programs PRAa stored in the storage device 260 may be one, three, or more. Similarly, the number of unpermitted application programs PRAb stored in the storage device 260 is not limited to an example shown in FIG. 1B. For example, the number of unpermitted application programs PRAb stored in storage device 260 may be two or more. Alternatively, all of the application programs PRA stored in storage device 260 may be permitted application programs PRAa (in other words, no unpermitted application programs PRAb may be stored in the storage device 260). In addition, the plurality of terminal apparatuses 200 may include a terminal apparatus 200 with the storage device 260 not storing the permitted application program PRAa, and a terminal apparatus 200 with the storage device 260 storing the permitted application program PRAa.

The communication device 270 is hardware (transmitter/receiver device) for communicating with other devices via the network NW, and the communication device 270 includes a configuration that is the same as a configuration of the communication device 170 described above.

The input device 280 is an input device (for example, a keyboard, s mouse, a microphone, a switch, a button, and a sensor, etc.) configured to accept input from the outside. For example, the input device 280 accepts operations for inputting a symbol such as a numeral and a letter, etc., to the processor 210, and operations for selecting an icon displayed on a screen of the terminal apparatus 200. For example, a touch panel configured to detect contact with the screen of the terminal apparatus 200 is suitable as the input device 280. The input device 280 may include a plurality of operation elements capable of being operated by a user.

The output device 290 is an output device, such as a display, etc., configured to execute output to the outside. The output device 290 displays images, for example, under the control of the processor 210. For example, various display panels, such as liquid crystal display panels and organic electroluminescent (EL) display panels, etc., are suitably used as the output device 290. The input device 280 and the output device 290 may be in an integrated configuration (for example, a touch panel). The output device 290 may be an output device including a loudspeaker and a light emitting diode (LED) lamp, etc.

A configuration of the management apparatus 100, a configuration of the quality control apparatus 190, and a configuration of the terminal apparatus 200 are not limited to examples shown in FIG. 1. For example, the management apparatus 100 may include an input device and an output device, as well as the terminal apparatus 200. For example, the management apparatus 100 may include an auxiliary storage device. The auxiliary storage device is a recording medium readable by the management apparatus 100, and the auxiliary storage device may include, for example, at least one of an optical disc, such as a compact disc ROM (CD-ROM), etc., a hard disk drive, a flexible disc, a magnetooptical disk (for example, a compact disc, a digital versatile disc, or a Blu-ray (registered trademark) disc), a smart card, a flash memory (for example, a card, a stick, or a key drive), a floppy (registered trademark) disk, and a magnetic strip, etc. Similarly, one or both of the quality control apparatus 190 and the terminal apparatus 200 may include an auxiliary storage device. The auxiliary storage device may be referred to as "storage."

FIG. 2 is a sequence chart showing an example of an operation of the network system 1 shown in FIG. 1A. In the example shown in FIG. 2, it is assumed that the specific state is the foreground. In addition, in the operation shown in FIG. 2, it is assumed that the number of application programs PRA operable in the foreground is one. Note that a reference sign QoS1 in FIG. 2 indicates that the QoS control is executed at a QoS level requested by the permitted application program PRAa1, and that reference signs QoS2 in FIG. 2 each indicate that the QoS control is executed at a QoS level requested by the permitted application program PRAa2. In addition, a time at which the management apparatus 100 acquires the terminal information INFid transmitted from the terminal apparatus 200 is not strictly a time at which the terminal information INFid is transmitted from the terminal apparatus 200; however, for the sake of explanation, the following may be described on the assumption that the time at which the terminal information INFid is acquired is the same as the time at which the terminal information INFid is transmitted.

First, at time T10, the terminal apparatus 200 starts the unpermitted application program PRAb1 (S200). This causes the unpermitted application program PRAb1 to start operating in the foreground. Since an application program PRA being in operation in the foreground is the unpermitted application program PRAb1, a request to the management apparatus 100 and a request to the quality control apparatus 190, etc., are not generated in the terminal apparatus 200. Therefore, at time T10, the QoS control for the terminal apparatus 200 is not started. At time T20, the terminal apparatus 200 starts the permitted application program PRAa1 (S200). Since, at time T20, the permitted application program PRAa1 starts operating in the foreground, the operating state of the unpermitted application program PRAb1 is switched from the foreground to the background (S202).

In addition, based on the permitted application program PRAa1 starting operating in the foreground, the requester 220a1 of the terminal apparatus 200 transmits a QoS start request REQs for the start of the QoS control to the quality control apparatus 190 (S206). The QoS start request REQs transmitted based on the control of the requester 220a1 may include, for example, information indicative of a QoS level requested by the permitted application program PRAa1. Upon receipt of the QoS start request REQs, the quality control apparatus 190 transmits an acknowledgement response ACKs to the QoS start request REQs to the terminal apparatus 200 that transmitted the QoS start request REQs (S192). Then, the quality control apparatus 190 starts the QoS control (QoS1) at the QoS level specified by the QoS start request REQs, for example. This causes the QoS control (QOS1) to be executed at the QoS level requested by the permitted application program PRAa1 (S194).

At time T22, the transmission controller 230a1 of the terminal apparatus 200 transmits the terminal information INFid for identifying the terminal apparatus 200 to the management apparatus 100 (S110). Then, the transmission controller 230a1 transmits the terminal information INFid at intervals of a seconds (a is a positive value) to the management apparatus 100 until time T30 at which the operating state of the permitted application program PRAa1 is switched from the foreground to the background. In the example shown in FIG. 2, it is assumed that duration from time T28 to time T30 is less than a seconds; therefore, the terminal information INFid is not transmitted at time T30. During a period from time T22 to time T28, the operation determiner 120 of the management apparatus 100 acquires the terminal information INFid transmitted at intervals of a seconds from the terminal apparatus 200 (S110).

In the example shown in FIG. 2, based on next terminal information INFid not being acquired from the terminal apparatus 200 by a time at which b seconds (b is a value satisfying b>a) has elapsed since a time at which the terminal information INFid was acquired from the terminal apparatus 200, the operation determiner 120 of the management apparatus 100 determines that the transmission of the terminal information INFid from the terminal apparatus 200 has stopped. The "b seconds" belong to an example of a determination time. Based on determination that the transmission of the terminal information INFid from the terminal apparatus 200 has stopped, the operation determiner 120 determines that none of the permitted application programs PRAa is in operation in the foreground. Therefore, during the period from time T22 to time T28, the operation determiner 120 determines that at least one permitted application program PRAa is in operation in the foreground because the terminal information INFid is acquired at intervals of a seconds (a<b).

At time T30, the terminal apparatus 200 starts the permitted application program PRAa2 (S200). At time T30, based on the permitted application program PRAa2 starting operating in the foreground, the operating state of the permitted application program PRAa1 is switched from the foreground to the background (S202). Therefore, the transmission controller 230a1 of the terminal apparatus 200 stops processing of transmitting the terminal information INFid at intervals of a seconds.

In addition, based on the permitted application program PRAa2 starting operating in the foreground, the requester 220a2 of the terminal apparatus 200 transmits a QoS start request REQs for the start of the QoS control to the quality control apparatus 190 (S206). The QoS start request REQs transmitted based on the control of the requester 220a2 may include, for example, information indicative of a QOS level requested by the permitted application program PRAa2. Upon receipt of the QoS start request REQs, the quality control apparatus 190 transmits an acknowledgement response ACKs to the QoS start request REQs to the terminal apparatus 200 that transmitted the QoS start request REQs (S192). Then, the quality control apparatus 190 starts the QOS control (QoS2) at the QoS level specified by the QoS start request REQs, for example. This causes the QoS control (QoS2) to be executed at the QoS level requested by the permitted application program PRAa2 (S194).

At time T32, the transmission controller 230a2 of the terminal apparatus 200 transmits the terminal information INFid to the management apparatus 100 (S110). Then, the transmission controller 230a2 transmits the terminal information INFid at intervals of a seconds to the management apparatus 100 until time T38 at which the operating state of the permitted application program PRAa2 is switched from the foreground to the background. In the example shown in FIG. 2, it is assumed that duration from time T36 to time T38 is less than a seconds; therefore, the terminal information INFid is not transmitted at time T38.

In addition, in the example shown in FIG. 2, it is assumed that duration (i seconds) from time T28 to time T32 is less than b seconds. In this case, the operation determiner 120 of the management apparatus 100 acquires the terminal information INFid from the terminal apparatus 200 at time T32 prior to a time at which b seconds has elapsed since time T28 at which the terminal information INFid was acquired. Therefore, in a period from time T28 to time T36, the operation determiner 120 determines that at least one permitted application program PRAa is in operation in the foreground.

Thus, in the example shown in FIG. 2, even when the application program PRA operating in the foreground is switched from the permitted application program PRAa1 to the permitted application program PRAa2, the operation determiner 120 determines that the permitted application program PRAa is in operation in the foreground.

At time T38, the terminal apparatus 200 switches the operating state of the permitted application program PRAa2 from the foreground to the background (S202), and the terminal apparatus 200 switches the operating state of the unpermitted application program PRAb1 from the background to the foreground (S204). Since the operating state of the permitted application program PRAa2 is switched from the foreground to the background, the transmission controller 230a2 of the terminal apparatus 200 stops processing of transmitting the terminal information INFid at intervals of a seconds.

At time T40, the terminal apparatus 200 stops the permitted application program PRAa1 (S230). At time T40, the permitted application program PRAa1 is stopped in a case in which the permitted application program PRAa1 is in operation in the background; therefore, the QOS termination request REQe for the termination of the QoS control is not transmitted to the quality control apparatus 190.

At time T42 at which b seconds has elapsed since time T36, the termination processor 130 of the management apparatus 100 transmits the QOS termination request REQe for the termination of the QoS control to the quality control apparatus 190 (S160). For example, based on next terminal information INFid not being acquired from the terminal apparatus 200 by time T42 at which b seconds has elapsed since time T36 at which the terminal information INFid was acquired, the operation determiner 120 of the management apparatus 100 determines that the transmission of the terminal information INFid from the terminal apparatus 200 has stopped. Based on determination that the transmission of the terminal information INFid from the terminal apparatus 200 has stopped, the operation determiner 120 determines that none of the permitted application programs PRAa is in operation in the foreground.

In other words, at time T42, based on the next terminal information INFid not being acquired from the terminal apparatus 200 by the time at which h seconds has elapsed since time T36 at which the terminal information INFid was acquired, the operation determiner 120 determines that none of the permitted application programs PRAa is in operation in the foreground. Since the operation determiner 120 determines that none of the permitted application program PRAa is in operation in the foreground, the termination processor 130 transmits the QOS termination request REQe to the quality control apparatus 190. The QOS termination request REQe transmitted from the management apparatus 100 to the quality control apparatus 190 may include information (for example, terminal information INFid) indicative of a terminal apparatus 200 corresponding to the terminal information INFid of which transmission has stopped.

Upon receipt of the QoS termination request REQe, the quality control apparatus 190 transmits the acknowledgement response ACKe to the QoS termination request REQe to the management apparatus 100 that transmitted the QoS termination request REQe (S198). This causes the management apparatus 100 to receive the acknowledgement response ACKe to the QoS termination request REQe (S180). In addition, the quality control apparatus 190 terminates the QoS control (QoS2) for the terminal apparatus 200 indicated by the QoS termination request REQe. Thus, for the terminal apparatus 200 at which none of the permitted application programs PRAa is in operation in the foreground, the QoS control is terminated. Therefore, in this embodiment, it is possible to reduce the execution of the QoS control for the terminal apparatus 200 at which none of the permitted application programs PRAa is in operation in the foreground.

At time T44, the terminal apparatus 200 switches the operating state of the unpermitted application program PRAb1 from the foreground to the background (S202), and the terminal apparatus 200 switches the operating state of the permitted application program PRAa2 from the background to the foreground (S204). Based on the operating state of the permitted application program PRAa2 being switched from the foreground to the background, the requester 220a2 of the terminal apparatus 200 transmits the QoS start request REQs to the quality control apparatus 190 (S206). Upon receipt of the QoS start request REQs, the quality control apparatus 190 transmits the acknowledgement response ACKs to the QoS start request REQs to the terminal apparatus 200 that transmitted the QoS start request REQs (S192). Then, the quality control apparatus 190 resumes the QoS control (QoS2) at the QoS level specified by the QoS start request REQs, for example (S194). In addition, based on the operating state of the permitted application program PRAa2 being switched from the background to the foreground, the transmission controller 230a2 of the terminal apparatus 200 resumes the processing of transmitting the terminal information INFid at intervals of a seconds.

For example, the transmission controller 230a2 of the terminal apparatus 200 transmits the terminal information INFid at intervals of a seconds to the management apparatus 100 during a period from time T46 to time T50. The operation determiner 120 of the management apparatus 100 acquires the terminal information INFid transmitted at a seconds intervals from the terminal apparatus 200 during a period from time T46 to time T50 (S110).

At time T52, the terminal apparatus 200 stops the permitted application program PRAa2 (S230). The permitted application program PRAa2 stops in a case in which the permitted application program PRAa2 is in operation in the foreground; therefore, the requester 220a2 of the terminal apparatus 200 transmits the QoS termination request REQe for the termination of the QoS control to the quality control apparatus 190 (S216). Upon receipt of the QoS termination request REQe, the quality control apparatus 190 transmits the acknowledgement response ACKe to the QoS termination request REQe to the terminal apparatus 200 that transmitted the QoS termination request REQe (S198). In addition, the quality control apparatus 190 terminates the QoS control (QoS2) for the terminal apparatus 200 that transmitted the QoS termination request REQe. The terminal apparatus 200, which has transmitted the QoS termination request REQe to the quality control apparatus 190, may stop the permitted application program PRAa2 before receipt of the acknowledgement response ACKe, or the terminal apparatus 200 may stop the permitted application program PRAa2 after receipt of the acknowledgement response ACKe.

In addition, at time T52, based on the permitted application program PRAa2 having stopped, the operating state of the unpermitted application program PRAb1 is switched from the background to the foreground (S204). As described above, the QoS control (QoS2) for the terminal apparatus 200 has terminated; therefore, the QoS control is not executed for the unpermitted application program PRAb1.

At time T54, the terminal apparatus 200 stops the unpermitted application program PRAb1 (S230). Since the stopped application program PRA is the unpermitted application program PRAb1, a request to the management apparatus 100 and a request to the quality control apparatus 190, etc., are not generated in the terminal apparatus 200.

Thus, in this embodiment, for example, when the permitted application program PRAa operating in the foreground is successfully stopped, the QoS termination request REQe is transmitted from the terminal apparatus 200 to the quality control apparatus 190; therefore, the QoS control for the terminal apparatus 200 is successfully terminated. In addition, in this embodiment, even if the permitted application program PRAa operating in the foreground is abnormally stopped, the management apparatus 100, instead of the terminal apparatus 200, transmits the QoS termination request REQe to the quality control apparatus 190. Therefore, in this embodiment, it is possible to reduce continuation of the QoS control for the terminal apparatus 200 despite none of the permitted application programs PRAa being in operation in the foreground due to abnormal termination of the permitted application program PRAa. Therefore, in this embodiment, it is possible to reduce the execution of the QoS control for the terminal apparatus 200 at which none of the permitted application programs PRAa is in operation in the foreground.

The operation of the network system 1 is not limited to an example shown in FIG. 2. For example, a time, at which the terminal information INFid is first transmitted after the permitted application program PRAa starts operating in the foreground, may be prior to a time at which the terminal apparatus 200 receives the acknowledgement response ACKs to the QoS start request REQs. In other words, the time, at which the terminal information INFid is first transmitted after the permitted application program PRAa starts operating in the foreground, is not particularly limited. In addition, the QoS start request REQs may be repeatedly transmitted during a period in which the permitted application program PRAa is in operation in the foreground.

In addition, the requester 220 of the terminal apparatus 200 may transmit the QoS start request REQs to both the quality control apparatus 190 and the management apparatus 100. In this aspect, for example, based on the terminal information INFid not being acquired before b seconds has elapsed since a time at which the QoS start request REQs was received, the management apparatus 100 may transmit the QoS termination request REQe to the quality control apparatus 190. Therefore, for example, even if the permitted application program PRAa is abnormally stopped before initial terminal information INFid is transmitted from the terminal apparatus 200, this aspect is capable of reducing the execution of the QoS control for the terminal apparatus 200 at which none of the permitted application programs PRAa is in operation in the foreground.

In addition, the requester 220 of the terminal apparatus 200 may transmit the QoS termination request REQe to both the quality control apparatus 190 and the management apparatus 100. In this case, the management apparatus 100 is capable of confirming termination of the QoS control for the terminal apparatus 200 that transmitted the QoS termination request REQe. Therefore, immediately after receipt of the QoS termination request REQe, the management apparatus 100 is capable of terminating processing (determination whether the permitted application program PRAa is in operation in the foreground, etc.) about the terminal apparatus 200 that transmitted the QOS termination request REQe.

In addition, the management apparatus 100 may inquire of the terminal apparatus 200 whether the permitted application program PRAa is in operation in the specific state, for example. Then, for example, based on the terminal information INFid not being received by a time at which a predetermined time has elapsed since a time at which the inquiry was executed to the terminal apparatus 200, the operation determiner 120 of the management apparatus 100 may determine that none of the permitted application programs PRAa is in operation in the foreground.

Alternatively, based on an inquiry being present from the management apparatus 100, the transmission controller 230 of the terminal apparatus 200 may transmit the terminal information INFid, which includes information indicating whether the permitted application program PRAa is in operation in the specific state, to the management apparatus 100.

Figure 3:
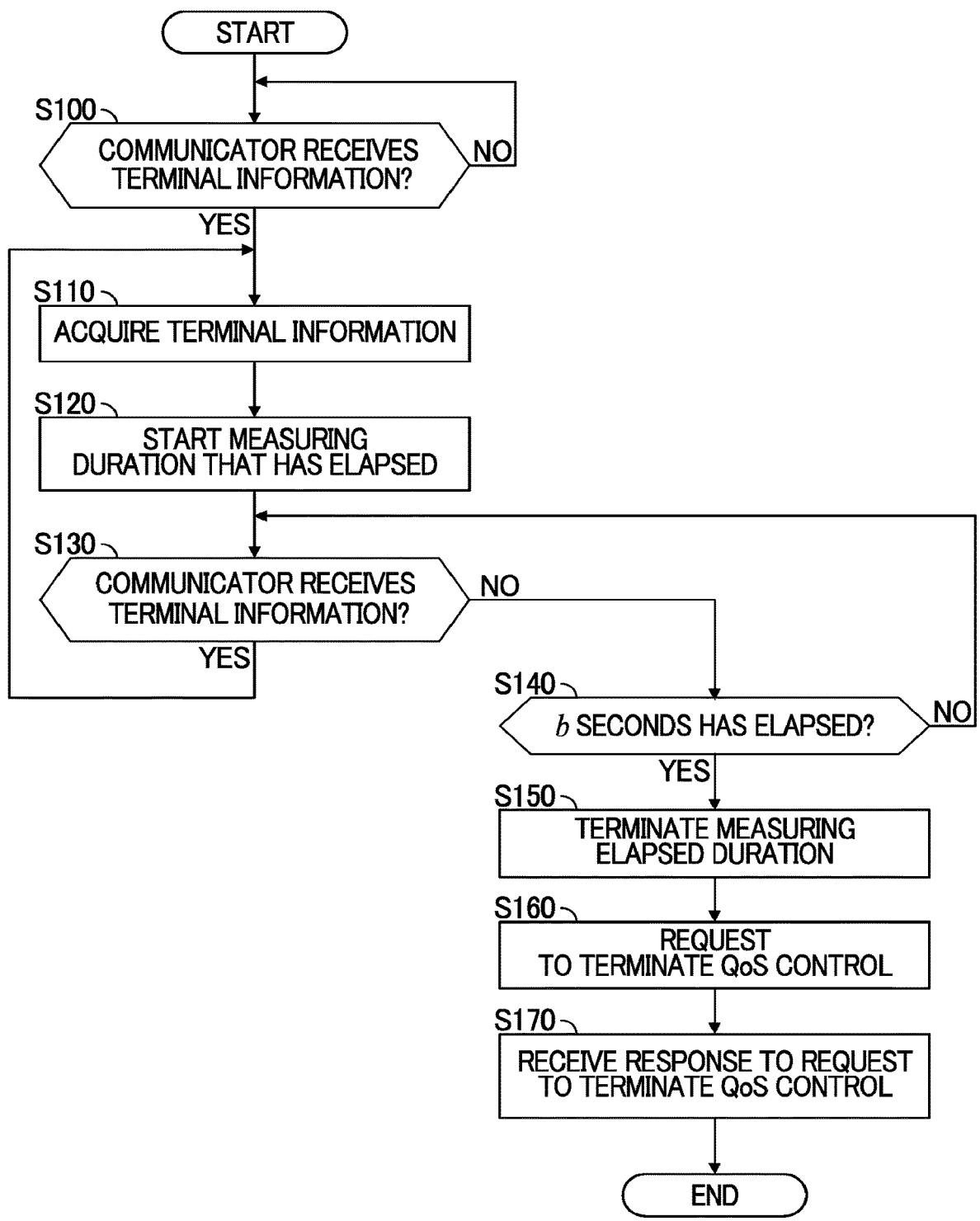
FIG. 3 is a flowchart showing an example of an operation of the management apparatus shown in FIG. 1A.

FIG. 3 is a flowchart showing an example of the operation of the management apparatus 100 shown in FIG. 1A. FIG. 3 shows an example of the operation of the management apparatus 100 for one terminal apparatus 200, on which the permitted application program PRAa is installed, from among the plurality of terminal apparatuses 200 connected to the network NW. Therefore, in the explanation for FIG. 3, unless otherwise noted, the terminal apparatus 200 means one terminal apparatus 200 that is a target for the operation shown in FIG. 3 executed by the management apparatus 100. In addition, the operation shown in FIG. 3, it is assumed that the number of application programs PRA operable in the foreground is one.

In step S100, the operation determiner 120 determines whether the communication device 170 receives the terminal information INFid from the terminal apparatus 200, for example. Based on a result of the determination in step S100 being affirmative, the operation determiner 120 proceeds the processing to step S110. On the other hand, based on the result of the determination in step S100 being negative, the operation determiner 120 returns the processing to step S100.

In step S110, the operation determiner 120 acquires the terminal information INFid transmitted from the terminal apparatus 200 via the communication device 170.

Next, in step S120, the operation determiner 120 starts measuring duration that has elapsed since a time at which the terminal information INFid was acquired. Note that, for example, when the operation determiner 120 is measuring duration that has elapsed since a time at which terminal information INFid, which was transmitted prior to the terminal information INFid that is acquired at this time, was acquired, the operation determiner 120 resets the measured duration to start measuring the duration that has elapsed since the time at which the terminal information INFid was acquired at this time.

Next, in step S130, the operation determiner 120 determines whether the communication device 170 receives the terminal information INFid from the terminal apparatus 200, for example. Based on a result of the determination in step S130 being affirmative, the operation determiner 120 returns the processing to step S110. On the other hand, based on the result of the determination in step S130 being negative, the operation determiner 120 proceeds the processing to step S140.

The determination in step S100 corresponds to determination whether the initial terminal information INFid is transmitted from the terminal apparatus 200 in a case in which the quality control apparatus 190 starts or resumes the QoS control for the terminal apparatus 200. In contrast, the determination in step S130 corresponds to determination whether the terminal information INFid is transmitted from the terminal apparatus 200 after the transmission of the initial terminal information INFid from the terminal apparatus 200. Therefore, whether the processing is returned to step S130 based on the result of the determination in step S130 being negative is determined based on a result of determination in step S140.

In step S140, the operation determiner 120 determines whether b seconds has elapsed since a time at which the terminal information INFid was acquired. In other words, the operation determiner 120 determines whether the transmission of the terminal information INFid from the terminal apparatus 200 has stopped. Based on a result of the determination in step S140 being affirmative, the operation determiner 120 proceeds the processing to step S150. On the other hand, based on the result of the determination in step S140 being negative, the operation determiner 120 returns the processing to step S130.

In step S150, the operation determiner 120 terminates measuring the elapsed duration.

Next, in step S160, the termination processor 130 requests the quality control apparatus 190 to terminate the QoS control for the terminal apparatus 200. For example, as described in FIG. 2, the termination processor 130 may request the quality control apparatus 190 to terminate the QoS control by transmitting the QoS termination request REQe to the quality control apparatus 190. Alternatively, the termination processor 130 may request the quality control apparatus 190 to terminate the QoS control by executing, for the quality control apparatus 190, a call to the API for the termination of the QoS control.

Next, in step S170, the management apparatus 100 (for example, the termination processor 130) receives the acknowledgement response ACKe from the quality control apparatus 190 as a response to the request to terminate the QoS control. The management apparatus 100 then terminates the operation shown in FIG. 3.

The operation of the management apparatus 100 is not limited to an example shown in FIG. 3. For example, the processing in step S150 may be executed after the processing in step S160, or the processing in step S150 may be executed in parallel with the processing of step S160. In addition, for example, in the processing in steps S110 and S130, determination whether the operation determiner 120 acquires the terminal information INFid may be executed instead of the determination whether the communication device 170 receives the terminal information INFid. In this case, the processing in step S110 may be executed in parallel with the processing in steps S100 and S130.

In addition, in step S120, the operation determiner 120 may store a time, at which the terminal information INFid is acquired from the terminal apparatus 200, in the storage device 160, etc., instead of starting measuring the duration. Alternatively, in a case in which the terminal information INFid includes a timestamp indicative of a time at which the terminal information INFid is transmitted from the terminal apparatus 200, the operation determiner 120 may store the time, at which the terminal information INFid is transmitted from the terminal apparatus 200, in the storage device 160, etc., in step S120. In the following, the time at which the management apparatus 100 acquires the terminal information INFid and the time at which the terminal information INFid is transmitted from the terminal apparatus 200 may be each referred to as an acquisition time regarding the terminal information INFid, without distinguishing between them.

In addition, if the operation determiner 120 stores the acquisition time regarding the terminal information INFid in the storage device 160, etc., the operation determiner 120 may determine in step S140 whether b seconds has elapsed since the time at which the terminal information INFid was acquired, by determining whether a difference between the acquisition time regarding the terminal information INFid and the current time is greater than or equal to b seconds.

In the first embodiment described above, the management apparatus 100 includes the operation determiner 120 and the termination processor 130. The operation determiner 120 determines whether at least one application program PRA (the permitted application program PRAa), which is a target for control of a quality of service (QOS control) for communication in the network NW, is in operation in the specific state at the terminal apparatus 200 connected to the network NW. In addition, the termination processor 130 executes processing to terminate the control of the quality of the service for the terminal apparatus 200 based on a result of determination by the operation determiner 120 being negative, that is, based on the permitted application program PRAa not being in operation in the specific state.

Therefore, in this embodiment, it is possible to terminate the QoS control for the terminal apparatus 200 at which the permitted application program PRAa is not in operation in the specific state, for example. In the terminal apparatus 200 at which the permitted application program PRAa is not in operation in the specific state, the unpermitted application program PRAb may be in operation in the specific state. In this case, in a system in which the management apparatus 100 is omitted, the QoS control may be executed for the unpermitted application program PRAb without terminating the QoS control for the terminal apparatus 200.

For example, if the terminal apparatus 200 switches the operating state of the permitted application program PRAa to the background after starting the permitted application program PRAa, the QoS control for the terminal apparatus 200 continues in the system in which the management apparatus 100 is omitted. If the unpermitted application program PRAb is started in this state, the QoS control is executed for the unpermitted application program PRAb. In the system in which the management apparatus 100 is omitted, if the permitted application program PRAa is abnormally stopped, the QoS termination request REQe is not transmitted; therefore, the QoS control continues for the terminal apparatus 200. In this case, when a user, who uses the system in which the management apparatus 100 is omitted, may intentionally stop the permitted application program PRAa abnormally, the QoS control can be executed for the unpermitted application program PRAb.

In contrast, in this embodiment, the management apparatus 100 executes the processing to terminate the QoS control for the terminal apparatus 200 at which the permitted application program PRAa is not in operation in the specific state; therefore, it is possible to reduce the execution of the QoS control for the unpermitted application program PRAb. In other words, in this embodiment, it is possible to reduce the execution of the QoS control for the application program PRA not permitted to use the QoS control, compared to the system in which the management apparatus 100 is omitted.

In addition, the terminal apparatus 200 includes the requester 220 and the transmission controller 230. The requester 220 requests the quality management system 10 (more precisely, the quality control apparatus 190) to start the QoS control based on a start of the permitted application program PRAa, and the requester 220 requests the quality management system 10 (more precisely, the quality control apparatus 190) to terminate the QoS control based on a stop of the permitted application program PRAa. The transmission controller 230 transmits the terminal information INFid at predetermined intervals (for example, at intervals of a seconds) to the quality management system 10 (more precisely, the management apparatus 100) in a period of time in which the operating state of the permitted application program PRAa is the specific state.

In this case, the operation determiner 120 acquires the terminal information INFid transmitted at the predetermined intervals from the terminal apparatus 200 at which the permitted application program PRAa is in operation in the specific state, for example. Then, based on the transmission of the terminal information INFid from the terminal apparatus 200 having stopped, the operation determiner 120 determines that the permitted application program PRAa is not in operation in the specific state. For example, the operation determiner 120 determines that the transmission of the terminal information INFid from the terminal apparatus 200 has stopped based on the terminal information INFid not being acquired from the terminal apparatus 200 until a determination time (for example b seconds longer than a seconds), which is longer than a respective predetermined interval, has lapsed since a time at which the terminal information INFid is acquired from the terminal apparatus 200. Thus, in this embodiment, by using the terminal information INFid transmitted at the predetermined intervals from the terminal apparatus 200, it is possible to easily determine whether the permitted application program PRAa is in operation in the specific state.

2. Second Embodiment

Figure 4:
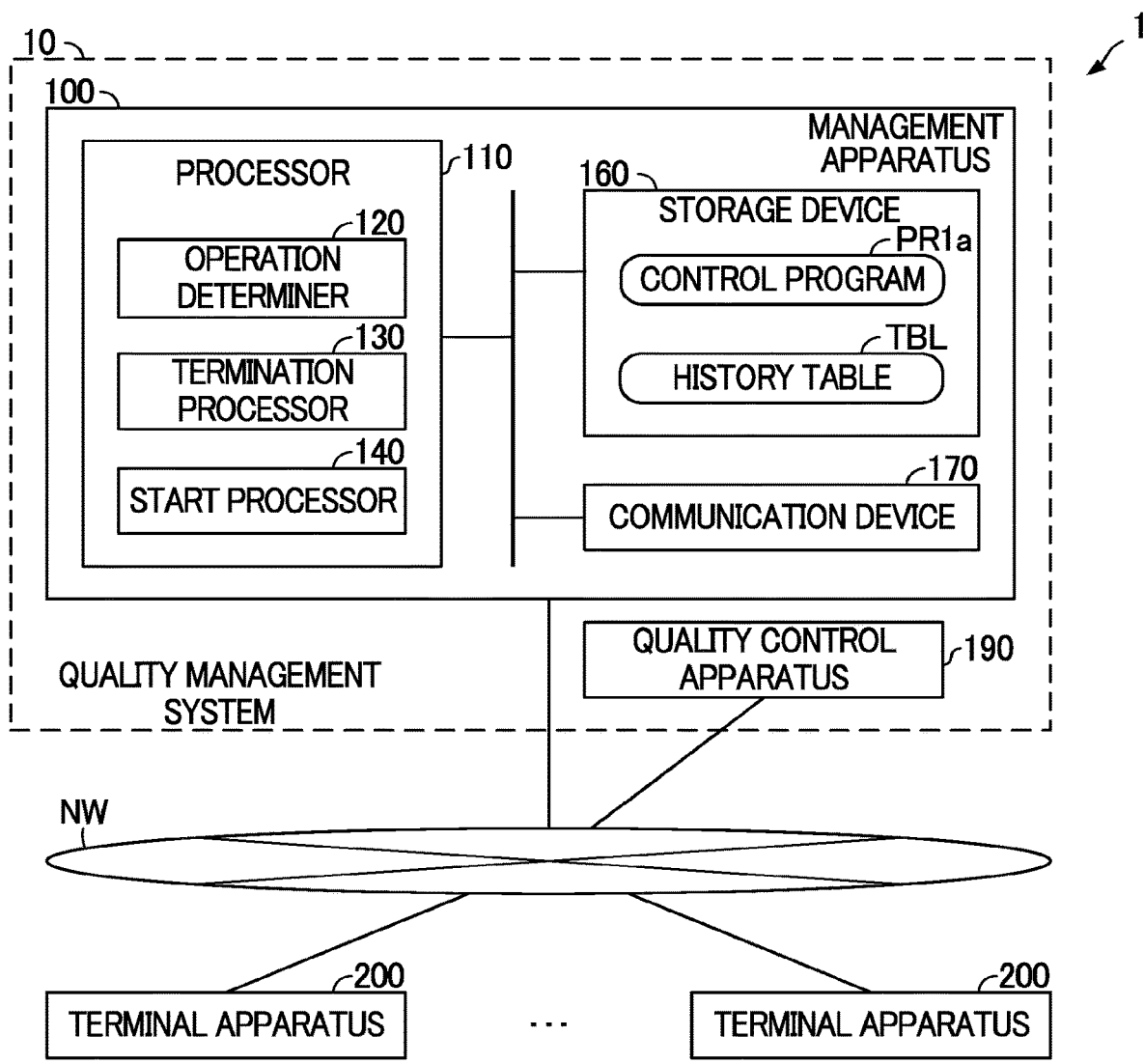
FIG. 4 is a block diagram showing an overall configuration of the network system including the management apparatus according to a second embodiment.

FIG. 4 is a block diagram showing an overall configuration of the network system 1 including the management apparatus 100 according to a second embodiment. Elements substantially the same as the elements described with reference to FIG. 1 to FIG. 3 are denoted with like reference signs, and detailed explanations thereof are omitted. Similarly to the network system 1 shown in FIG. 1A, the network system 1 shown in FIG. 4 includes the quality management system 10, the plurality of terminal apparatuses 200, and the network NW.

Figure 5:
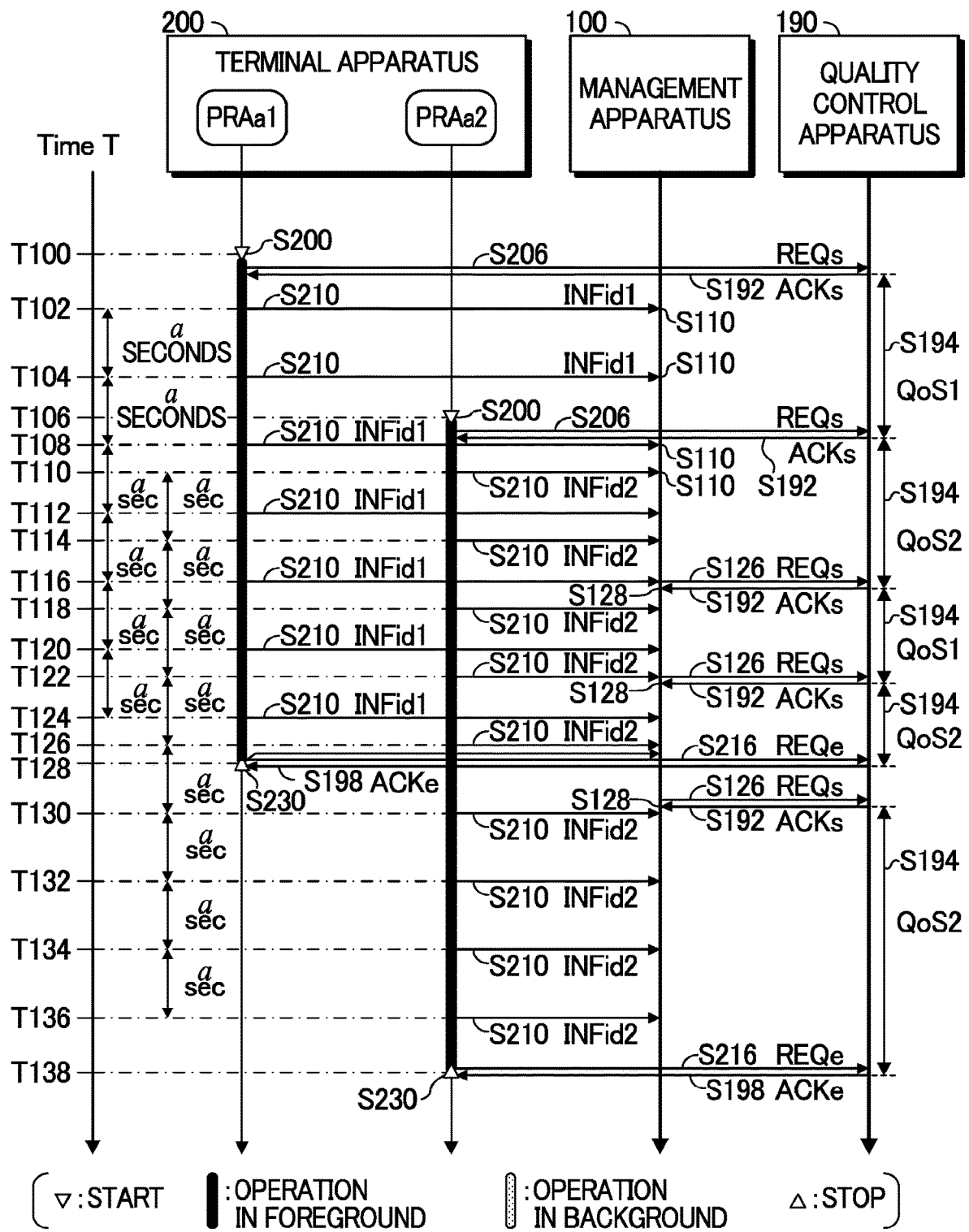
FIG. 5 is a sequence chart showing an example of an operation of the network system shown in FIG. 4.

The terminal apparatus 200 shown in FIG. 4 is the same as the terminal apparatus 200 shown in FIG. 1B. However, in this embodiment, the terminal information INFid transmitted from the terminal apparatus 200 includes application identification information indicative of the permitted application program PRAa that operates the transmission controller 230 that transmitted the terminal information INFid. For example, terminal information INFid1 shown in FIG. 5 is the terminal information INFid transmitted from the transmission controller 230a1 realized by executing the permitted application program PRAa1, and the terminal information INFid1 includes application identification information indicative of the permitted application program PRAa1. In addition, for example, terminal information INFid2 shown in FIG. 5 is the terminal information INFid transmitted from the transmission controller 230a2 realized by executing the permitted application program PRAa2, and the terminal information INFid2 includes application identification information indicative of the permitted application program PRAa2.

The quality management system 10 shown in FIG. 4 includes the management apparatus 100 and the quality control apparatus 190, as in the quality management system 10 shown in FIG. 1A. The quality control apparatus 190 shown in FIG. 4 is the same as the quality control apparatus 190 shown in FIG. 1A. In addition, the management apparatus 100 shown in FIG. 4 is the same configuration as the management apparatus 100 shown in FIG. 1A. For example, the management apparatus 100 includes the processor 110, the storage device 160 and the communication device 170. However, a control program PR1a stored in the storage device 160 is different from the control program PR1 shown in FIG. 1A. Therefore, for example, functions realized by the processor 110 executing the control program PR1a stored in the storage device 160 are different from the functions realized by the processor 110 shown in FIG. 1A. In addition, in this embodiment, the storage device 160 stores a history table TBL. The history table TBL stores history information indicative of a history of acquisition of the terminal information INFid for each terminal apparatus 200. The history information includes, for example, information indicative of a time at which the terminal information INFid was acquired.

The processor 110 shown in FIG. 4 is the same as the processor 110 shown in FIG. 1A except for executing the control program PR1a instead of the control program PR1 shown in FIG. 1A. For example, the processor 110 reads the control program PR1a from the storage device 160, and the processor 110 executes the read control program PR1a to function as the operation determiner 120, the termination processor 130, and a start processor 140.

The operation determiner 120 and the termination processor 130 are the same as the operation determiner 120 and the termination processor 130 that are shown in FIG. 1A, respectively. The operation determiner 120 may determine whether the plurality of permitted application programs PRAa is in operating in the specific state. For example, in a terminal apparatus 200 with a plurality of display screens, or in a terminal apparatus 200 with a function to display a plurality of display windows on a display screen, it is likely that the plurality of permitted application programs PRAa is in operation in the foreground in a case in which the specific state is the foreground. In this case, for example, the operation determiner 120 is capable of, based on the history information stored in the history table TBL, determining whether a plurality of permitted application programs PRAa is in operation in the specific state.

When the plurality of permitted application programs PRAa is in operation in the specific state at the terminal apparatus 200, the start processor 140 selects, based on the history information stored in the history table TBL, a QoS level to be requested to the quality control apparatus 190 from among QoS levels corresponding to the plurality of permitted application programs PRAa. The start processor 140 then requests the quality control apparatus 190 to start the QoS control such that the QoS control is executed for the terminal apparatus 200 at the QoS level selected based on the history information. Details of an operation of the start processor 140 are described with reference to FIG. 5, described later. The start processor 140 is an example of a selector.

FIG. 5 is a sequence chart showing an example of an operation of the network system 1 shown in FIG. 4. Detailed explanations are omitted for operations similar to those described in FIG. 1 to FIG. 3. In FIG. 5, it is assumed that the unpermitted application program PRAb is not being executed. To clarify FIG. 5, in FIG. 5, reference signs may be omitted for processing executed repeatedly (for example, processing in step S110). In the example shown in FIG. 5, it is assumed that the requester 220 of the terminal apparatus 200 transmits the QoS termination request REQe to both the management apparatus 100 and the quality control apparatus 190.

First, at time T100, the terminal apparatus 200 starts the permitted application program PRAa1 (S200). Based on the permitted application program PRAa1 starting operating in the foreground, the requester 220a1 of the terminal apparatus 200 transmits the QoS start request REQs to the quality control apparatus 190 (S206). Upon receipt of the QoS start request REQs, the quality control apparatus 190 transmits the acknowledgement response ACKs to the QoS start request REQs to the terminal apparatus 200 that transmitted the QoS start request REQs (S192). Then, the quality control apparatus 190 starts the QoS control (QoS1) at the QoS level specified by the QoS start request REQs, for example. This causes the QoS control (QoS1) to be executed at the QoS level requested by the permitted application program PRAa1 (S194).

During a period from time T102 to time T124, the transmission controller 230a1 of the terminal apparatus 200 transmits the terminal information INFid1 at intervals of a seconds to the management apparatus 100 (S210). In addition, during the period from time T102 to time T124, the operation determiner 120 of the management apparatus 100 acquires the terminal information INFid1 transmitted at intervals of a seconds from the terminal apparatus 200 (S110). Note that the terminal information INFid1 includes the application identification information indicative of the permitted application program PRAa1. Therefore, the operation determiner 120 determines that the permitted application program PRAa1 is in operation in the foreground during the period from time T102 to time T124.

At time T106 between time T104 and time T108, the terminal apparatus 200 starts the permitted application program PRAa2 (S200). Note that, the example shown in FIG. 5, it is assumed that the plurality of permitted application programs PRAa is allowed to be in operation in the foreground; therefore, the permitted application program PRAa1 continues being in operation in the foreground even when the permit application program PRAa2 starts operating in the foreground. Consequently, in the example shown in FIG. 5, the permitted application program PRAa1 and the permitted application program PRAa2 are in operation in the foreground until one of the permitted application program PRAa1 and the permitted application program PRAa2 stops (from time T106 to time T128).

In addition, at time T106, based on the permitted application program PRAa2 starting operating in the foreground, the requester 220a2 of the terminal apparatus 200 transmits the QoS start request REQs to the quality control apparatus 190 (S206). Upon receipt of the QoS start request REQs, the quality control apparatus 190 transmits the acknowledgement response ACKs to the QoS start request REQs to the terminal apparatus 200 that transmitted the QoS start request REQs (S192). Then, the quality control apparatus 190 starts the QoS control (QoS2) at the QoS level specified by the QoS start request REQs, for example. This causes the QoS control (QoS2) to be executed at the QoS level requested by the permitted application program PRAa2 (S194). In other words, the QoS level of the QoS control for the terminal apparatus 200 is switched from the QoS level requested by the permitted application program PRAa1 to the QoS level requested by the permitted application program PRAa2.

During a period from time T110 to time T136, the transmission controller 230a2 of the terminal apparatus 200 transmits the terminal information INFid2 at intervals of a seconds to the management apparatus 100 (S210). In addition, during the period from time T110 to time T136, the operation determiner 120 of the management apparatus 100 acquires the terminal information INFid2 transmitted at intervals of a seconds from the terminal apparatus 200 (S110). Note that the terminal information INFid2 includes the application identification information indicative of the permitted application program PRAa2. Therefore, the operation determiner 120 determines that the permitted application program PRAa2 is in operation in the foreground during the period from time T110 to time T136.

Thus, in the example shown in FIG. 5, during a period (a period from time T110 to time T124) in which the period from time T102 to time T124 and the period from time T110 to time T136 overlap, it is determined that two permitted application programs including the permitted application programs PRAa1 and PRAa2 are in operation in the foreground.

For example, based on the terminal information INFid2 being acquired at time T110 prior to time T112 at which a seconds has elapsed since time T108 at which the terminal information INFid1 was acquired, the operation determiner 120 determines that the two permitted application programs including the permitted application programs PRAa1 and PRAa2 are in operation in the foreground. In this case, the start processor 140 of the management apparatus 100 may determine whether to transmit the QoS start request REQs to the quality control apparatus 190. In the example shown in FIG. 5, the QoS start request REQs is transmitted to prohibit intervals, at which the QoS level is switched, from being shorter than a seconds. Therefore, at time T110, the start processor 140 determines that the QoS start request REQs is not required to be transmitted. The determination whether the plurality of permitted application programs PRAa is in operation in the foreground may be executed by the start processor 140.

At time T114 at which a seconds has elapsed since time T110, the operation determiner 120 acquires the terminal information INFid2. The application identification information, which is included in the terminal information INFid2 acquired at time T110, and the application identification information, which is included in the terminal information INFid2 acquired at time T114, each indicate the same permitted application program PRAa2. Therefore, at time T114, the start processor 140 determines that the QoS start request REQs is not required to be transmitted.

At time T116 at which a duration longer than a seconds has elapsed since time T110, the operation determiner 120 acquires the terminal information INFid1. Based on the terminal information INFid1 being acquired at time T116 prior to time T118 at which a seconds has elapsed since time T114 at which the terminal information INFid2 was acquired, the operation determiner 120 determines that the two permitted application programs including the permitted application programs PRAa1 and PRAa2 are in operation in the foreground. In addition, the application identification information, which is included in the terminal information INFid2 acquired at time T114, and the application identification information, which is included in the terminal information INFid1 acquired at time T116, each indicate a different permitted application program PRAa. Therefore, the start processor 140 determines that the QoS start request REQs is required to be transmitted to the quality control apparatus 190.

Therefore, at time T116, the start processor 140 transmits the QoS start request REQs, which includes information indicative of the QoS level requested by the permitted application program PRAa1, to the quality control apparatus 190 (S126). Upon receipt of the QoS start request REQs, the quality control apparatus 190 transmits the acknowledgement response ACKs to the QoS start request REQs to the management apparatus 100 that transmitted the QoS start request REQs (S192). Therefore, the management apparatus 100 receives the acknowledgement response ACKs to the QoS start request REQs (S128).

In addition, the quality control apparatus 190 starts the QoS control (QoS1) at the QoS level specified by the QoS start request REQs, for example. This causes the QoS control (QOS1) to be executed at the QoS level requested by the permitted application program PRAa1 (S194). In other words, the QoS level of the QoS control for the terminal apparatus 200 is switched from the QoS level requested by the permitted application program PRAa2 to the QoS level requested by the permitted application program PRAa1.

At time T122, as in the operation at time T116, the QoS level of the QoS control for the terminal apparatus 200 is switched from the QoS level requested by the permitted application program PRAa1 to the QoS level requested by the permitted application program PRAa2. In this way, during a period in which the two permitted application programs including the permitted application programs PRAa1 and PRAa2 are in operation in the foreground, the QoS level of the QoS control for the terminal apparatus 200 is alternately switched between the QoS level requested by the permitted application program PRAa1 and the QoS level requested by the permitted application program PRAa2.

At time T128, the terminal apparatus 200 stops the permitted application program PRAa1 (S230). The permitted application program PRAa1 stops in a case in which the permitted application program PRAa1 is in operation in the foreground; therefore, the requester 220a1 of the terminal apparatus 200 transmits the QoS termination request REQe for the termination of the QoS control to both the management apparatus 100 and the quality control apparatus 190 (S216). Upon receipt of the QoS termination request REQe, the quality control apparatus 190 transmits the acknowledgement response ACKe to the QoS termination request REQe to the terminal apparatus 200 that transmitted the QoS termination request REQe (S198). In addition, the quality control apparatus 190 terminates the QoS control (QoS2) for the terminal apparatus 200 that transmitted the QoS termination request REQe.

In addition, upon receipt of the QoS termination request REQe, the management apparatus 100 transmits the QoS start request REQs, which includes information indicative of the QoS level requested by the permitted application program PRAa2, to the quality control apparatus 190 because the permitted application program PRAa2 is in operation in the foreground (S126). Upon receipt of the QoS start request REQs, the quality control apparatus 190 transmits the acknowledgement response ACKs to the QoS start request REQs to the management apparatus 100 that transmitted the QoS start request REQs (S192). Therefore, the management apparatus 100 receives the acknowledgement response ACKs to the QoS start request REQs (S128). In addition, the quality control apparatus 190 resumes the QOS control (QOS2) at the QoS level specified by the QoS start request REQs, for example (S194).

An operation during a period from time T130 to time T136 is similar to an operation during a period from time T46 to time T52 shown in FIG. 2. For example, at time T138, the terminal apparatus 200 stops the permitted application program PRAa2 (S230). The permitted application program PRAa2 stops in a case in which the permitted application program PRAa2 is in operation in the foreground; therefore, the requester 220a2 of the terminal apparatus 200 transmits the QoS termination request REQe to the quality control apparatus 190 (S216). Upon receipt of the QoS termination request REQe, the quality control apparatus 190 transmits the acknowledgement response ACKe to the QoS termination request REQe to the terminal apparatus 200 that transmitted the QoS termination request REQe (S198). In addition, the quality control apparatus 190 terminates the QoS control (QoS2) for the terminal apparatus 200 that transmitted the QoS termination request REQe.

Thus, in this embodiment, for example, when the plurality of permitted application programs PRAa is in operation in the specific state at the terminal apparatus 200, it is possible to select a QoS level to be requested to the quality control apparatus 190 from among QoS levels corresponding to the plurality of permitted application programs PRAa. Therefore, it is possible to reduce the execution of the QoS control at a QoS level inappropriate for the permitted application program PRAa that is in operation in the specific state.

The operation of the network system 1 is not limited to the example shown in FIG. 5. For example, the requester 220 of the terminal apparatus 200 may transmit the QoS start request REQs to both the quality control apparatus 190 and the management apparatus 100. In addition, for example, the QoS termination request REQe may be transmitted from the terminal apparatus 200 to the quality control apparatus 190 via the management apparatus 100. In this aspect, for example, based on the permitted application program PRAa, which is not a target for the QoS termination request REQe, being in operation in the foreground, the management apparatus 100 may not forward the QoS termination request REQe, which was transmitted from the terminal apparatus 200, to the quality control apparatus 190. Specifically, for example, at time T128 in FIG. 5, the management apparatus 100 (for example, the operation determiner 120 or the termination processor 130) may not forward the QoS termination request REQe, which is transmitted from the requester 220A1 of the terminal apparatus 200, to the quality control apparatus 190. In this case, the QoS control (QoS2) for the terminal apparatus 200 continues during a period from time T122 to time T138.

In addition, for example, the requester 220 of the terminal apparatus 200 may not transmit the QoS termination request REQe to the management apparatus 100 in a case in which the QoS start request REQs is repeatedly transmitted during a period in which the permitted application program PRAa is in operation in the foreground.

Figure 6:
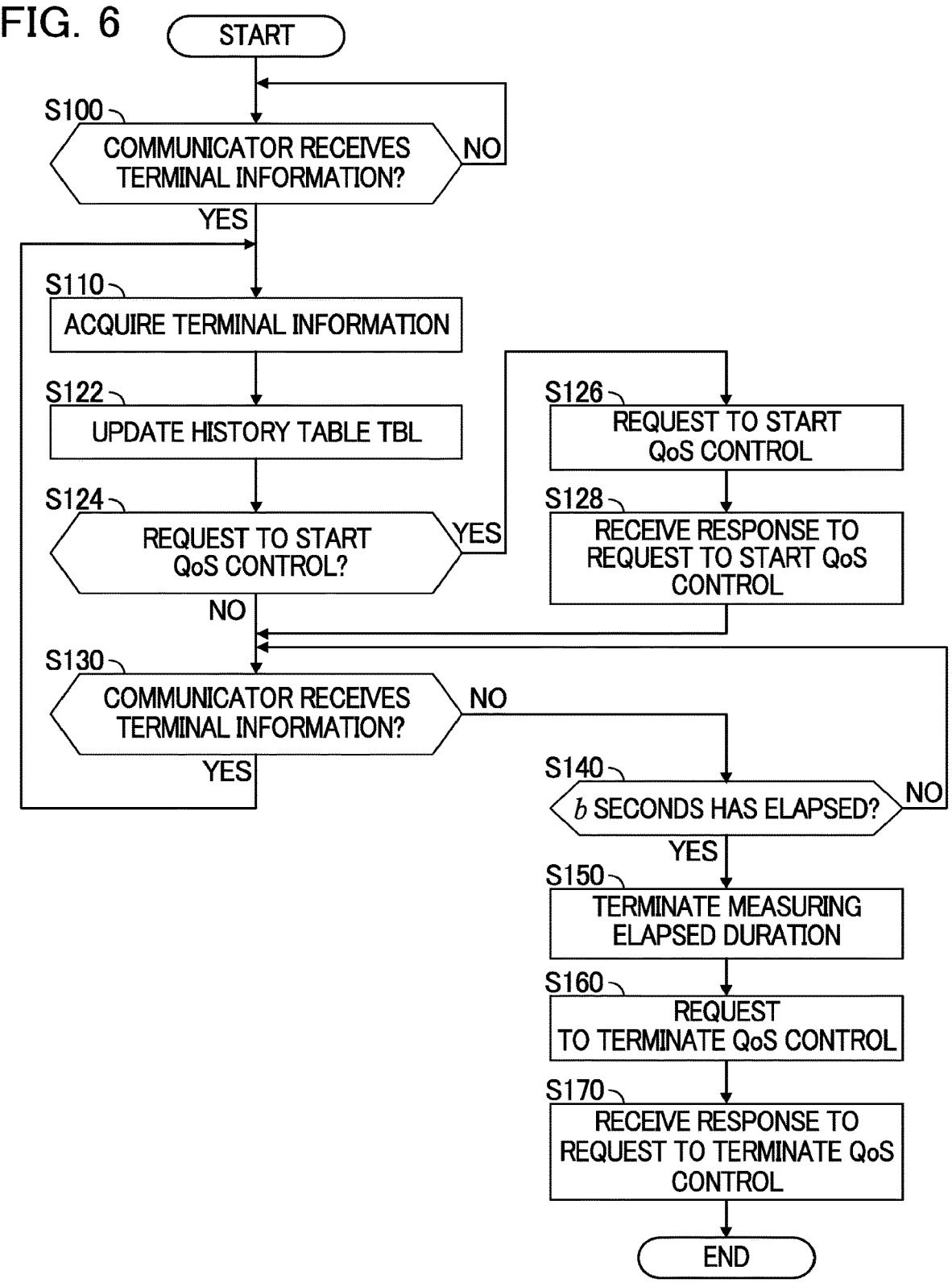
FIG. 6 is a flowchart showing an example of an operation of the management apparatus shown in FIG. 4.

FIG. 6 is a flowchart showing an example of an operation of the management apparatus 100 shown in FIG. 4. To facilitate description, in FIG. 6, a description of an operation of the management apparatus 100 is omitted that is executed in response to receipt of the QoS termination request REQe from the terminal apparatus 200. Processing, which is executed in response to the management apparatus 100 receiving the QoS termination request REQe from the terminal apparatus 200, may be executed as interruption processing for an operation shown in FIG. 6, or may be executed in parallel with the operation shown in FIG. 6.

The operation shown in FIG. 6 is similar to the operation shown in FIG. 3, and the operation shown in FIG. 6 shows an example of an operation of the management apparatus 100 for one terminal apparatus 200, on which the permitted application program PRAa is installed, from among the plurality of terminal apparatuses 200 connected to the network NW. Therefore, in the explanation for FIG. 6, unless otherwise noted, the terminal apparatus 200 means one terminal apparatus 200 that is a target for the operation shown in FIG. 6 executed by the management apparatus 100.

In the operation shown in FIG. 6, instead of processing in step S120 shown in FIG. 3, processing in step S122 is executed, and a series of processing from step S124 to step S128 is added to the operation shown in FIG. 3. In addition, in the operation shown in FIG. 6, the history table TBL (the history information regarding the terminal information INFid transmitted from the terminal apparatus 200) is initialized before execution of the processing in step S100. The other operations shown in FIG. 6 are similar to those shown in FIG. 3. Therefore, in FIG. 6, processing in step S122, which is executed after execution of the processing in step S110, and the series of processing from step S124 to step S128 will be described.

In step S122, the operation determiner 120 updates the history table TBL based on the terminal information INFid acquired at step S110. For example, the operation determiner 120 stores, as the history information, the acquisition time regarding the terminal information INFid (a time at which the terminal information INFid is acquired, or a time at which the terminal information INFid is transmitted) in the history table TBL for each the permitted application program PRAa. The permitted application program PRAa that corresponds to the acquisition time regarding the terminal information INFid is determined based the application identification information included in the terminal information INFid.

The history table TBL may store only the acquisition time regarding the latest terminal information INFid for each the permitted application program PRAa, alternatively, the history table TBL may store a plurality of acquisition times regarding the terminal information INFid, which includes the acquisition time regarding the terminal information INFid transmitted in the past, for each the permitted application program PRAa. In addition, the 20 history table TBL may store information indicative of the QoS level requested by the permitted application program PRAa.

Next, in step S124, based on the history information stored in the history table TBL, the start processor 140 determines whether to request the quality control apparatus 190 to start the QoS control. For example, the start processor 140 determines not to request to start the QoS control based on the number of permitted application programs PRAa that are in operation in the specific state (for example, the foreground) being one. In a case in which the plurality of permitted application programs PRAa is in operation in the specific state, the start processor 140 may determine to request the quality control apparatus 190 to start the QoS control, and alternatively, the start processor 140 may determine whether to request the quality control apparatus 190 to start the QoS control based on a predetermined condition being satisfied.

The predetermined condition may be, for example, a condition that intervals at which the start of the QOS control is requested be greater than or equal to a predetermined time (for example, a seconds). Alternatively, for example, the predetermined condition may be a condition that the permitted application program PRAa corresponding to the terminal information INFid acquired at this time be different from the permitted application program PRAa corresponding to the terminal information INFid acquired previously. Alternatively, for example, in a case in which priority regarding order of the execution of the QoS control for each of the permitted application programs PRAa be predetermined, the predetermined condition may be a condition based on the priority. The condition based on the priority may be, for example, a condition that the QoS control for the terminal apparatus 200 is switched into the QoS control, which corresponds to the permitted application program PRAa with the highest priority from among the plurality of permitted application programs PRAa that is in operation in the specific state, in response to requesting to start the QoS control. The predetermined condition is not limited to the above example.

Based on a result of the determination in step S124 being affirmative, the start processor 140 proceeds the processing to step S126. On the other hand, based on the result of the determination in step S124 being negative, the start processor 140 proceeds the processing to step S130.

In step S126, the start processor 140 requests the quality control apparatus 190 to start the QoS control for the terminal apparatus 200. For example, the start processor 140 selects, based on the history information stored in the history table TBL, a QOS start request REQs, which satisfies the predetermined condition described above, from among QoS start requests REQs corresponding to the plurality of permitted application programs PRAa that is in operation in the specific state. Then, the start processor 140 transmits the QoS start request REQs selected based on the history information to the quality control apparatus 190. Note that the start processor 140 may request the quality control apparatus 190 to start the QoS control by executing a call to the API for the start of the QoS control, for the quality control apparatus 190.

In this way, the start processor 140 selects, based on the terminal information INFid, the QoS control corresponding to one permitted application program PRAa from among the permitted application programs PRAa, as the QoS control for the terminal apparatus 200. Then, the start processor 140 requests the quality control apparatus 190 to start the QoS control selected based on the terminal information INFid. The history information stored in the history table TBL is updated based on the terminal information INFid, as described above. Therefore, selecting the QoS start request REQs based on the history information means selecting a QoS start request REQs based on the terminal information INFid.

In response to executing processing in step S126, processing in step S128 is executed. In step S128, the management apparatus 100 (for example, the start processor 140) receives the acknowledgement response ACKs, as a response to the request to start the QoS control, from the quality control apparatus 190. The management apparatus 100 then proceeds the processing to step S130.

The operation of the management apparatus 100 is not limited to the example shown in FIG. 6. For example, the operation determiner 120 may measure the elapsed duration as in the operation shown in FIG. 3. In addition, for example, the determination in step S124 may be executed by the operation determiner 120.

In the second embodiment described above, the management apparatus 100 includes the operation determiner 120, the termination processor 130, and the start processor 140. The start processor 140 selects, based on the terminal information INFid, the QoS control corresponding to one permitted application program PRAa from among the permitted application programs PRAa that is in operation in the specific state, as the QoS control for the terminal apparatus 200. Then, the start processor 140 requests the quality control apparatus 190 to start the QoS control selected based on the terminal information INFid. Therefore, in this embodiment, it is possible to obtain the following effects in addition to effects similar to those of the first embodiment described above.

For example, in this embodiment, even when the plurality of permitted application programs PRAa is in operation in the specific state, it is possible to cause the quality control apparatus 190 to execute the QoS control for the terminal apparatus 200. In addition, in this embodiment, for example, as explained with reference to FIG. 5 and FIG. 6, it is possible to select, based on the terminal information INFid, the QoS control to be requested to the quality control apparatus 190 as the QoS control for the terminal apparatus 200 such that the QoS control is switched periodically. Therefore, in this embodiment, it is possible to reduce continuation of the QoS control at a QoS level inappropriate for the permitted application program PRAa that is in operation in the specific state.

3. Modifications

The invention is not limited to the embodiments described above. Specific modifications will be explained below. Two or more modifications freely selected from the following modifications may be combined.

First Modification

In the first embodiment and the second embodiment described above, examples are indicated in which the timing for requesting to start the QoS control is not particularly limited; however, the present invention is not limited to these embodiments. For example, as shown in FIG. 7, the requester 220 of the terminal apparatus 200 may transmit the QoS start request REQs to the quality control apparatus 190 at a time at which a predetermined wait time (for example, c seconds) has elapsed since the permitted application program PRAa started operating in the foreground.

Figure 7:
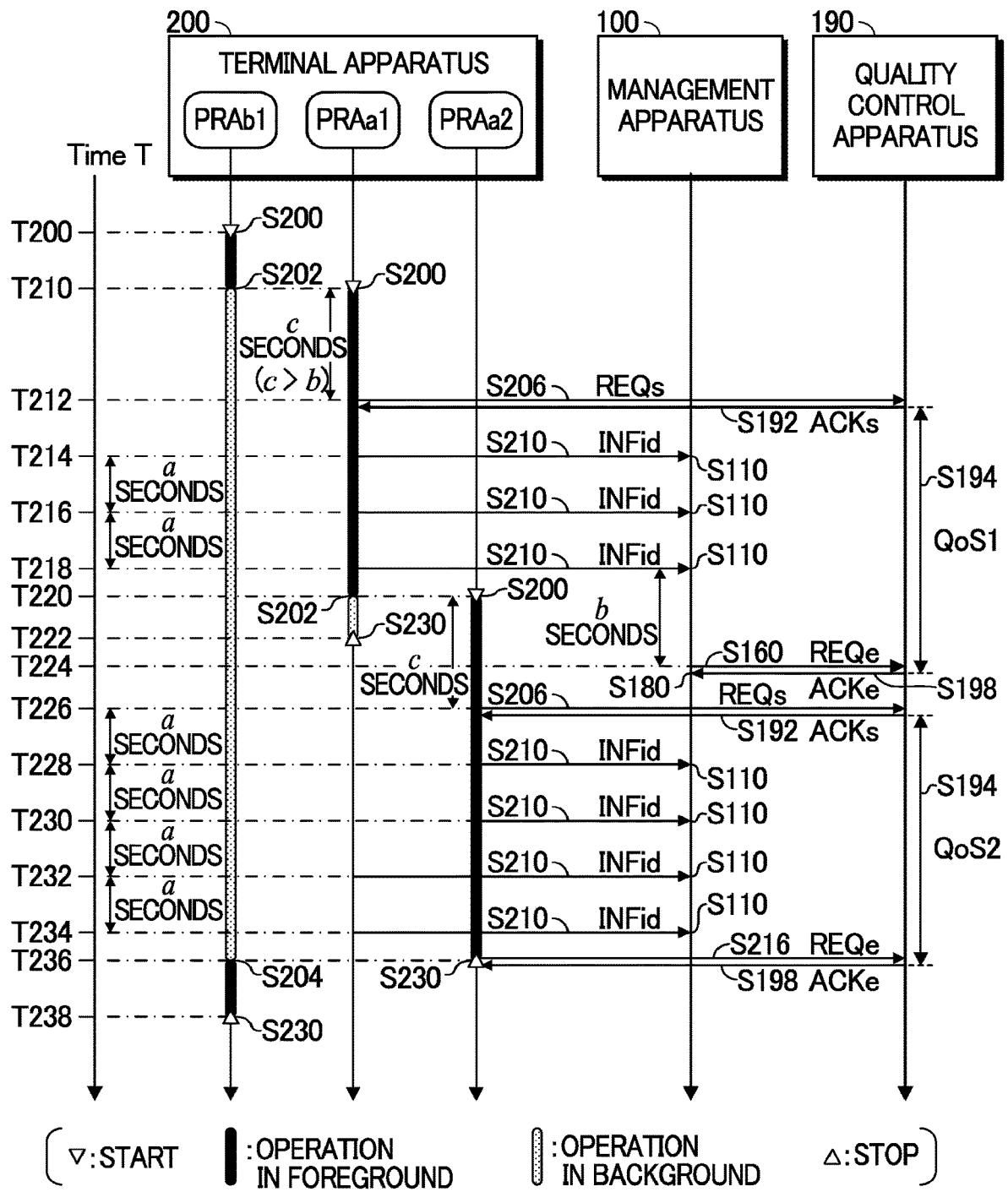
FIG. 7 is a sequence chart showing an example of an operation of the network system according to a first modification.

FIG. 7 is a sequence chart showing an example of an operation of the network system 1 according to a first modification. In the operation shown in FIG. 7, it is assumed that the number of application programs PRA operable in the foreground is one. In addition, in the operation shown in FIG. 7, a time, at which the terminal information INFid is first transmitted after the permitted application program PRAa starts operating in the foreground, is after a time at which the QoS start request REQs is transmitted. Detailed explanations are omitted for operations similar to those described with reference to FIG. 1 to FIG. 6.

First, at time T200, the terminal apparatus 200 starts the unpermitted application program PRAb1 (S200).

At time T210, the terminal apparatus 200 starts the permitted application program PRAa1 (S200). In the example shown in FIG. 7, the QoS start request REQs is not transmitted to the quality control apparatus 190 until a time (for example, time T212) at which c seconds longer than b seconds (determination time) has elapsed since a time at which the permitted application program PRAa started operating in the foreground.

At time T212 at which c seconds has elapsed since time T210 at which the permitted application program PRAa1 started operating in the foreground, the requester 220a1 of the terminal apparatus 200 transmits the QoS start request REQs to the quality control apparatus 190 (S206). Upon receipt of the QoS start request REQs, the quality control apparatus 190 transmits the acknowledgement response ACKs to the QoS start request REQs to the terminal apparatus 200 that transmitted the QoS start request REQs (S192). Then, the quality control apparatus 190 starts the QoS control (QoS1) at the QoS level specified by the QoS start request REQs, for example. This causes the QoS control (Qos1) to be executed at the QoS level requested by the permitted application program PRAa1 (S194).

During a period from time T214 to time T218, the transmission controller 230a1 of the terminal apparatus 200 transmits the terminal information INFid at intervals of a seconds to the management apparatus 100 (S210). Therefore, during the period from time T214 to time T218, the operation determiner 120 of the management apparatus 100 acquires the terminal information INFid transmitted at intervals of a seconds from the terminal apparatus 200 (S110).

At time T220, the terminal apparatus 200 starts the permitted application program PRAa2 (S200). In addition, at time T220, based on the permitted application program PRAa2 starting operating in the foreground, the operating state of the permitted application program PRAa1 is switched from the foreground to the background (S202). Therefore, the transmission controller 230a1 of the terminal apparatus 200 stops processing of transmitting the terminal information INFid at intervals of a seconds. In addition, since the transmission of the terminal information INFid by the transmission controller 230a2 of the terminal apparatus 200 starts after the requester 220a2 transmits the QoS start request REQs, the terminal information INFid is not transmitted even when b seconds has elapsed since time T218 at which the transmission controller 230a1 finally transmitted the terminal information INFid. At time T222, the terminal apparatus 200 stops the permitted application program PRAa1 (S230).

At time T224 at which b seconds has elapsed since time T218, the termination processor 130 of the management apparatus 100 transmits the QoS termination request REQe to the quality control apparatus 190 (S160). For example, based on next terminal information INFid not being acquired from the terminal apparatus 200 by time T224 at which b seconds has elapsed since time T218 at which the terminal information INFid was acquired, the operation determiner 120 of the management apparatus 100 determines that the transmission of the terminal information INFid from the terminal apparatus 200 has stopped.

Thus, in the example shown in FIG. 7, when the application program PRA that is in operation in the foreground is switched from the permitted application program PRAa1 to the permitted application program PRAa2, the QoS termination request REQe is transmitted to the quality control apparatus 190.

Upon receipt of the QoS termination request REQe, the quality control apparatus 190 transmits the acknowledgement response ACKe to the QOS termination request REQe to the management apparatus 100 that transmitted the QoS termination request REQe (S198). Then, the quality control apparatus 190 terminates the QoS control (QoS2) for the terminal apparatus 200 indicated by the QoS termination request REQe. At time T238, the terminal apparatus 200 stops the unpermitted application program PRAb1 (S230).

In the first modification, it is possible to obtain effects similar to those in the first embodiment and the second embodiment described above. Furthermore, in the first modification, the management apparatus 100 requests the quality control apparatus 190 to terminate the QoS control each time the permitted application program PRAa that is in operation in the specific state is switched; therefore, the quality control apparatus 190 can easily specify a request to start the QoS control corresponding to a request to terminate the QoS control.

Second Modification

In the first embodiment, the second embodiment, and the first modification described above, an example of the quality management system 10 including a plurality of quality control apparatuses 190 is not particularly described; however, the quality management system 10 may include the plurality of quality control apparatuses 190. In a case in which the quality management system 10 includes the plurality of quality control apparatuses 190, in other words, in a case in which the network system 1 includes the plurality of quality control apparatuses 190, a load on the quality control apparatuses 190 is distributed.

Figure 8:
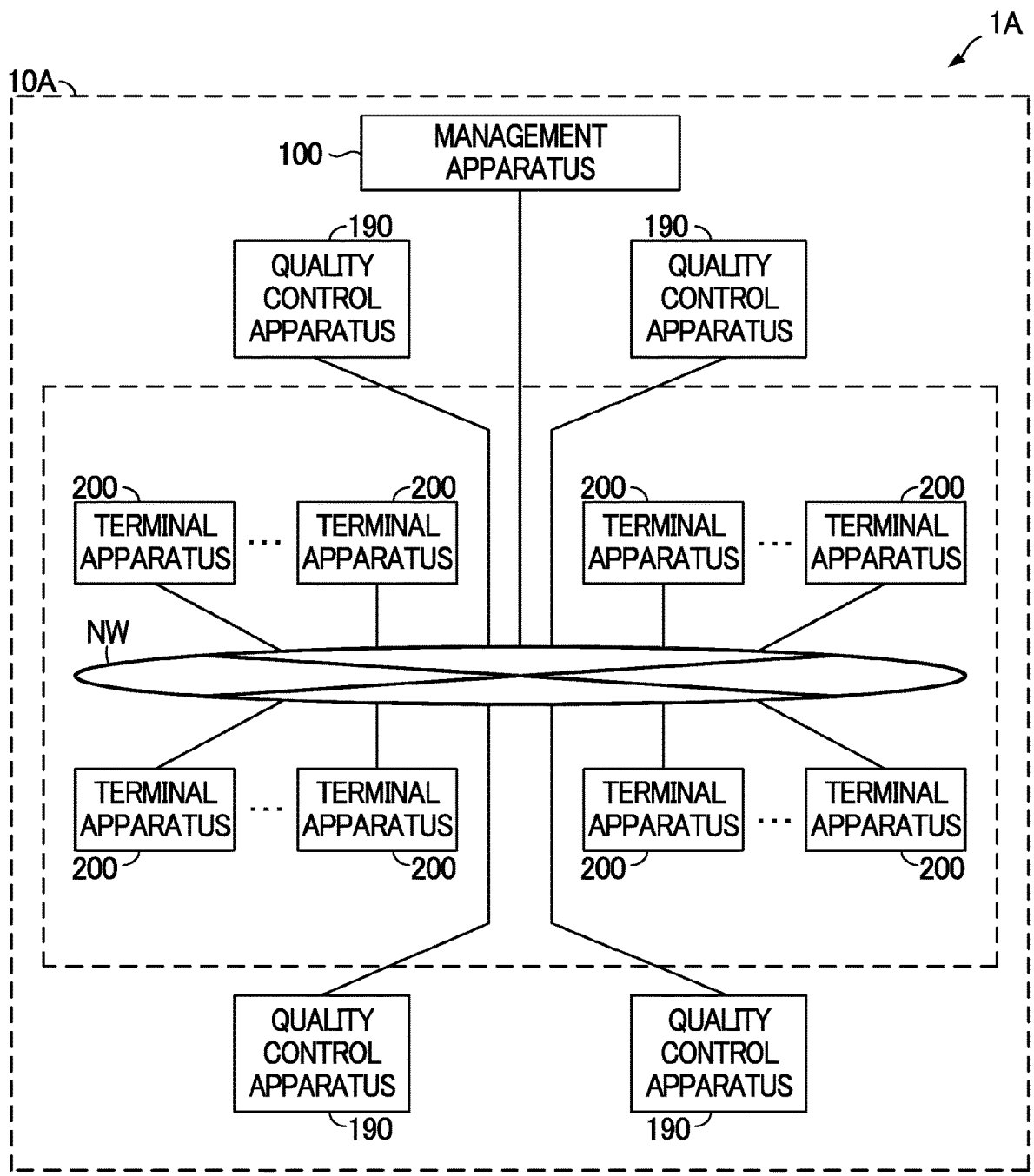
FIG. 8 is a block diagram showing an overall configuration of the network system according to a second modification.

FIG. 8 is a block diagram showing an overall configuration of a network system 1A according to a second modification. A network system 1A shown in FIG. 8 includes a quality management system 10A, the plurality of terminal apparatuses 200 and the network NW. The quality management system 10A includes the plurality of quality control apparatuses 190 and the management apparatus 100. The management apparatus 100, the quality control apparatus 190, and the terminal apparatus 200 are similar to the management apparatus 100, the quality control apparatus 190, and the terminal apparatus 200 shown in FIG. 1, respectively. However, the management apparatus 100 is different from the management apparatus 100 shown in FIG. 1A in that the management apparatus 100 executes processing to specify the quality control apparatus 190 operable to execute the QoS control corresponding to a request from the terminal apparatus 200.

For example, each of the plurality of quality control apparatuses 190 may control a quality of service regarding a part of network (hereinafter also referred to as a partial network), which is a pre-allocated portion of the network NW, for each terminal apparatus 200. For example, the partial network allocated to each quality control apparatus 190 may be determined based on a region at which the respective quality control apparatus 190 is installed, or alternatively, the partial network may be determined based on base stations included in the network NW. In the network system 1A shown in FIG. 8, it is assumed that the quality control apparatus 190, which executes the QoS control for the terminal apparatus 200, is selected from among the quality control apparatuses 190 based on a location of the terminal apparatus 200.

The termination processor 130 of the management apparatus 100 specifies, based on the result of the determination by the operation determiner 120 being negative, in other words, based on the permitted application program PRAa not being in operation in the specific state, the quality control apparatus 190 executing the QoS control for the terminal apparatus 200 from among the quality control apparatuses 190, for example. For example, the termination processor 130 may specify the quality control apparatus 190 executing the QOS control for the terminal apparatus 200 based location information indicative of the location of the terminal apparatus 200. The location information of the terminal apparatus 200 is not particularly limited, and the location information may be, for example, information indicative of a result of measurement using a global positioning system (GPS). In this case, the location information of the terminal apparatus 200 may be included, for example, in the terminal information INFid. The location information of the terminal apparatus 200 may be obtained by using a cell ID assigned to a base station with which the terminal apparatus 200 communicates. The cell ID is identification information that uniquely identifies the base station.

In addition, the termination processor 130 of the management apparatus 100 specifies the quality control apparatus 190 executing the QoS control for the terminal apparatus 200, and then the termination processor 130 requests the specified quality control apparatus 190 to terminate the QOS control for the terminal apparatus 200. In this way, the termination processor 130 of the management apparatus 100 is capable of terminating the QoS control for the terminal apparatus 200 at which the permitted application program PRAa is not in operation in the specific state even when the quality management system 10A includes the plurality of quality control apparatuses 190.

In addition, based on the location of the terminal apparatus 200 (for example, the location information of the terminal apparatus 200), the operation determiner 120 of the management apparatus 100 may determine whether the quality control apparatus 190 executing the QoS control for the terminal apparatus 200 has been switched from one quality control apparatus 190 to another quality control apparatus 190. Then, based on the operation determiner 120 determining that the quality control apparatus 190 executing the QoS control for the terminal apparatus 200 has been switched from one quality control apparatus 190 to another quality control apparatus 190, the termination processor 130 may request the one quality control apparatus 190 to terminate the QoS control for the terminal apparatus 200. One quality control apparatus 190 is an example of a first quality control apparatus, and another quality control apparatus 190 is an example of a second quality control apparatus.

In a configuration (hereinafter referred to as a comparison configuration) in which the termination of the QoS control is not requested to one quality control apparatus 190 when the quality control apparatus 190 executing the QoS control has been switched from the one quality control apparatus 190 to another quality control apparatus 190, the following problems may occur. The problems in the comparison configuration will 15 be described, for example, in a case in which a location corresponding to a partial network assigned to the one quality control apparatus 190 is referred to as a first location, whereas a location corresponding to a partial network assigned to the other quality control apparatus 190 is referred to as a second location. In the following description of the problems, it is assumed that the QoS start request REQs is repeatedly transmitted to the quality control apparatus 190 during a period of time in which the permitted application program PRAa is in operation in the foreground.

In the comparison configuration, when the terminal apparatus 200, for which the QoS control is executed in the first location, moves to the second location, the transmission of the terminal information INFid to the management apparatus 100 is not stopped; therefore, the QoS control executed by the one quality control apparatus 190 is not terminated. In addition, for example, when the operating state of the permitted application program PRAa at the terminal apparatus 200 that has moved to the second location is switched to the background, the QoS termination request REQe is transmitted from the management apparatus 100 to the other quality control apparatus 190; however, the QoS termination request REQe is not transmitted to the one quality control apparatus 190. Therefore, the QoS control executed by the other quality control apparatus 190 is terminated; however, the QoS control executed by the one quality control apparatus 190 is not terminated. In this state, when the terminal apparatus 200 returns to the first location, the unpermitted application program PRAb that is in operation in the foreground at the terminal apparatus 200 will obtain the effects of the QoS control. In other words, in the comparison configuration, the QoS control may be executed for the unpermitted application program PRAb.

In contrast, in the second modification, when the quality control apparatus 190 executing the QoS control is switched from one quality control apparatus 190 to another quality control apparatus 190, the termination of the QoS control is requested to the one quality control apparatus 190; therefore, it is possible to reduce the execution of the QoS control for the unpermitted application program PRAb.

Third Modification

In the first embodiment, the second embodiment, the first modification, and the second modification described above, an example of the network system 1 including a plurality of management apparatuses 100 is not particularly described; however, the network system 1 may include the plurality of management apparatuses 100. In the network system 1 including the plurality of management apparatuses 100, the load on the management apparatuses 100 is distributed.

FIG. 9 is a block diagram showing an overall configuration a network system 1B according to a third modification. The network system 1B shown in FIG. 9 includes a plurality of quality management systems 10, the plurality of terminal apparatuses 200, a distribution apparatus 300, and the network NW. Each quality management system 10 includes the management apparatus 100 and the quality control apparatus 190. Therefore, the management apparatuses 100 are in one-to-one correspondence with the quality control apparatuses 190. The management apparatus 100, the quality control apparatus 190, and the terminal apparatus 200 are the same as the management apparatus 100, the quality control apparatus 190, and the terminal apparatus 200 that are shown in FIG. 1, respectively.

The distribution apparatus 300 is, for example, an information processing apparatus such as a server, etc., and the distribution apparatus 300 is communicable with the quality management systems 10 and the terminal apparatuses 200 connected to the network NW. The distribution apparatus 300 is, for example, is realized by a computer system including a processor 310 configured to control the entire contribution apparatus 300, a storage device 360 configured to store various data such as a control program PR3, etc., and a communication device 370 configured to communicate with other devices via the network NW, as in the management apparatus 100. For example, the processor 310 executes the control program PR3 to function as a distributor 320.

The distributor 320 acquires, for example, the terminal information INFid transmitted at predetermined intervals (for example, at a seconds intervals) from one terminal apparatus 200, at which the permitted application program PRAa is in operation in the specific state, from among the plurality of terminal apparatuses 200 connected to the network system 1B. Then, the distributor 320 transmits the terminal information INFid, which is acquired from the one terminal apparatus 200, to one of the management apparatuses 100. For example, the distributor 320 may specify a quality control apparatus 190, which is to execute the QoS control for the terminal apparatus 200, from among the plurality of quality control apparatuses 190 based on the location of the terminal apparatus 200 (for example, the location information on the terminal apparatus 200). Then, the distributor 320 transmits the terminal information INFid, which is acquired from the one terminal apparatus 200, to the management apparatus 100 corresponding to the quality control apparatus 190 specified based on the location of the terminal apparatus 200, etc., from among the plurality of management apparatuses 100.

Therefore, the management apparatus 100 receives the terminal information INFid from the one terminal apparatus 200 via the distribution apparatus 300. Accordingly, based on the terminal information INFid acquired from the one terminal apparatus 200 via the distribution apparatus 300, the operation determiner 120 of the management apparatus 100 determines whether the permitted application program PRAa is in operation in the specific state at the one terminal apparatus 200. In addition, based on a result of the determination executed by the operation determiner 120 being negative, the termination processor 130 of the management apparatus 100 requests the corresponding quality control apparatus 190 of the plurality of quality control apparatuses 190 to terminate the QoS control for the one terminal apparatus 200.

Thus, in the third modification, even when the network system 1B includes the plurality of management apparatuses 100, the management apparatus 100 is capable of terminating the QoS control for the terminal apparatus 200 at which the permitted application program PRAa is not in operation in the specific state.

Fourth Modification

In the first embodiment, the second embodiment, the first modification, the second modification, and the third modification described above, the terminal information INFid may be transmitted to the management apparatus 100 in such a manner that the terminal information INFid is distinguishable from information which is transmitted from the terminal apparatus 200 to the management apparatus 100 based on none of the permitted application programs PRAa being in operation in the specific state.

For example, the terminal information INFid may be encrypted in accordance with an encryption method notified based on an application business operator paying a usage fee for the QoS control to a carrier. Alternatively, certificate information may be added to the terminal information INFid. Alternatively, for example, the terminal information INFid may be transmitted from the terminal apparatus 200 to the management apparatus 100 through encrypted communication.

Alternatively, the terminal apparatus 200 on which the permitted application program PRAa is installed is certified, and then the storage device 160, etc., of the management apparatus 100 may store a certification table in which identification information (that is, the terminal information INFid) such as an Internet protocol (IP), etc., indicative of the certified terminal apparatus 200 is registered. The management apparatus 100 can determine whether the terminal information INFid is transmitted from the certified terminal apparatus 200 by referring to the certification table.

In the fourth modification, it is possible to reduce the transmission of the terminal information INFid from a terminal apparatus 200, which impersonates the terminal apparatus 200 at which the permitted application program PRAa is in operation in the specific state, to the management apparatus 100.

Fifth Modification

In the second embodiment described above, a case is not particularly described in which both the permitted application program PRAa and the unpermitted application program PRAb are in operation in the specific state; however, the QoS control may not be executed when the unpermitted application program PRAb is in operation in the specific state.

For example, in some terminal apparatuses 200, one application program PRA that is in operation in the foreground may not recognize details of another application program PRA even though the one application program PRA recognizes that the other application program PRA is in operation in the foreground. In other words, some terminal apparatuses 200 may not recognize whether another application program PRA that is in operation in the foreground is a permitted application program PRAa. In this case, the requester 220 corresponding to the permitted application program PRAa that is in operation in the foreground may transmit the QoS termination request REQe to the quality control apparatus 190 based on recognition that another application program PRA is in operation in the foreground. Therefore, it is possible to reduce the execution of the QoS control for the unpermitted application program PRAb.

4. Others Matters (1) In the foregoing embodiments, the storage device 160 is a recording medium readable by the processor 110, such as ROM and RAM; however, the storage device 160 may be flexible disks, magneto-optical disks (e.g., compact disks, digital multi-purpose disks, Blu-ray (registered trademark) discs, smartcards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums. The program may be transmitted from a network via telecommunication lines. Alternatively, the program may be transmitted from a communication network via telecommunication lines.

(2) The foregoing embodiments may be applicable to at least one of systems using Long Term Evolution (LTE), LTE-advanced (LTE-A), SUPER 3G, IMT-Advanced, 4th generation mobile communication system (4G), 5th generation mobile communication system (5G), future radio access (FRA), new Radio (NR), W-CDMA (registered trademark), GSM (registered trademark), CDMA2000, ultra mobile broadband (UMB), IEEE 802.11 (Wi-Fi), IEEE 802.16 (WiMAX (registered trademark)), IEEE 802.20, Ultra-wideband (UWB), Bluetooth (registered trademark), and other appropriate systems, and next-generation systems extended based on the system. In addition, the embodiments described above may be applicable to a combination of multiple systems (for example, a combination of 5G with at least one of LTE and LTE-A, etc.).

(3) In the foregoing embodiments, information, signals and the like may be presented by use of various techniques. For example, data, instructions, commands, information, signals, bits, symbols, chips, and the like may be presented by freely selected combination of voltages, currents, electromagnetic waves, magnetic fields or magnetic particles, light fields or photons.

(4) In the foregoing embodiments, input and/or output information, etc., may be stored in a specific location (e.g., memory) or may be managed by use of a management table. The information, etc., that is input and/or output may be overwritten, updated, or appended. The information, etc., that is output may be deleted. The information, etc., that is input may be transmitted to other devices.

(5) In the foregoing embodiments, determination may be made by values that can be represented by one bit (0 or 1), may be made in Boolean values (true or false), or may be made by comparing numerical values (for example, comparison with a predetermined value).

(6) The order of processes, sequences, flowcharts, etc., that have been used to describe the embodiments may be changed as long as they do not conflict. For example, although a variety of methods has been illustrated in this disclosure with a variety of elements of steps in exemplary orders, the specific orders presented herein are by no means limiting.

(7) Each of functions shown in drawings such as FIG. 1 is realized by freely selected combination of at least one of hardware and software. The method of realizing each functional block is not limited thereto. That is, each functional block may be implemented by one piece of device that is physically and/or logically aggregated. Alternatively, each functional block may be realized by directly and/or indirectly connecting two or more physically and/or logically separate pieces of device (by using cables and/or radio, for example), and using these devices. The functional block may be realized by combining the software with one device described above or these devices.

The communication devices 170, 270, and 370 are each hardware (a transmitting and receiving device) for communicating between computers via at least one of a wired network and a wireless network. The communication devices 170, 270, and 370 are each referred to as, for example, a network device, a network controller, a network card, or a communication module. The communication devices 170, 270, and 370 may each include a high-frequency switch, duplexers, filters, or frequency synthesizers to realize Frequency Division Duplexing (FDD) and/or Time Division Duplexing (TDD: Time Division (Duplexing), for example.

(8) In the foregoing embodiments, programs, whether referred to as software, firmware, middleware, microcode, hardware description language, or by any other name, are instructions, instruction sets, code, code segments, or program code. It should be interpreted broadly to mean programs, subprograms, software modules, applications, software applications, software packages, routines, subroutines, objects, executable files, execution threads, procedures, functions, etc.

Software, instructions and so forth may be transmitted and received via communication media. For example, when software is transmitted from a website, a server, or other remote sources, by using wired technologies such as coaxial cables, optical fiber cables, twisted-pair cables, and digital subscriber lines (DSL), and/or wireless technologies such as infrared radiation, radio and microwaves, etc., these wired technologies and/or wireless technologies are also included in the definition of communication media.

(9) In each embodiment described above, the terms "system" and "network" are used interchangeably.

(10) The information and parameters described in this disclosure may be represented by absolute values, may be represented by relative values with respect to predetermined values, or may be represented by using other pieces of applicable information. For example, radio resources may be specified by predetermined indices. The names used for parameters in this specification are in no respect limiting. In addition, equations and/or the like to use these parameters may be other than those explicitly disclosed in this specification. For example, since a variety of channels (for example, PUCCH, PDCCH, etc.) and information elements (for example, TPC) can be identified by any suitable names, a variety of names to assign to these various channels and information elements are in no respect limiting.

(11) In the foregoing embodiments, the terminal apparatus 200 may be a mobile station (MS). A mobile station (mobile device) may be referred to, by one skilled in the art as a "subscriber station", a "mobile unit", a "subscriber unit", a "wireless unit", a "remote unit", a "mobile device", a "wireless device", a "wireless communication device", a "remote device", a "mobile subscriber station", an "access terminal", a "mobile terminal", a "wireless terminal", a "remote terminal", a "handset", a "user agent", a "mobile client", a "client", or some other suitable terms. The terms "mobile station", "user terminal", "user equipment (UE)", "terminal", and the like may be used interchangeably in the present disclosure.

(12) In the foregoing embodiments, the terms "connected" and "coupled", or any modification of these terms, may mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access." As used in this specification, two elements may be considered "connected" or "coupled" to each other by using one or more electrical wires, cables and/or printed electrical connections, and to name a number of non-limiting and non-inclusive examples, by using electromagnetic energy, such as electromagnetic energy having wavelengths in radio frequency regions, microwave regions and optical (both visible and invisible) regions.

(13) In the foregoing embodiments, the phrase "based on" as used in this specification does not mean "based only on", unless specified otherwise. In other words, the phrase "based on" means both "based only on" and "based at least on."

(14) The term "determining" as used in this specification may encompass a wide variety of actions. For example, the term "determining" may be used when practically "determining" that some act of calculating, computing, processing, deriving, investigating, looking up (for example, looking up a table, a database, or some other data structure), ascertaining and so forth has taken place. Furthermore, "determining" may be used when practically "determining" that some act of receiving (for example, receiving information), transmitting (for example, transmitting information), inputting, outputting, accessing (for example, accessing data in a memory) and so forth has taken place. Furthermore, "determining" may be used when practically "determining" that some act of receiving (for example, receiving information), transmitting (for example, transmitting information), inputting, outputting, accessing (for example, accessing data in a memory) and so forth has taken place. That is, "determining" may be used when practically determining to take some action. The term "judgment (decision)" may be replaced with "assuming", "expecting", "considering", etc.

(15) As long as terms such as "include", "comprise" and modifications of these are used in the foregoing embodiments, these terms are intended to be inclusive, in a manner similar to the way the term "provide" is used. Furthermore, the term "or" as used in this specification or in claims is not intended to be an exclusive disjunction.

(16) In the present disclosure, when articles such as, for example, "a", "an" and "the" are added in the English translation, these articles may also indicate plural forms of words, unless the context clearly indicates otherwise.

(17) In this disclosure, the phrase "A and B are different" may mean "A and B are different from each other." The phrase "A and B are different from C, respectively" may mean that "A and B are different from C." Terms such as "separated" and "combined" may be interpreted in the same way as "different."

(18) The examples and embodiments illustrated in this specification may be used individually or in combination, which may be altered depending on the mode of implementation. A predetermined piece of information (for example, a report to the effect that something is "X") does not necessarily have to be indicated explicitly, and may be indicated in an implicit way (for example, by not reporting this predetermined piece of information, by reporting another piece of information, etc.).

Although the disclosure is described in detail, it should be obvious to one skilled in the art that the present invention is by no means limited to the embodiments described in this specification. The present disclosure can be implemented with a variety of corrections and in a variety of modifications, without departing from the spirit and scope of the present invention defined as in the recitations of the claims. Consequently, the description in this specification is provided only for the purpose of explaining examples and should by no means be construed to limit the present invention in any way.

DESCRIPTION OF REFERENCE SIGNS 1, 1A, 1B . . . network system, 10 . . . quality management system, 100 . . . management apparatus, 110 . . . processor, 120 . . . operation determiner, 130 . . . termination processor, 140 . . . start processor, 160 . . . storage device, 170 . . . communication device, 190 . . . quality control apparatus, 200 . . . terminal apparatus, 210 . . . processor, 220 . . . requester, 230 . . . transmission controller, 240 . . . application processor, 260 . . . storage device, 270 . . . communication device, 280 . . . input device, 290 . . . output device, 300 . . . distribution apparatus, 310 . . . processor, 320 . . . distributor, 360 . . . storage device, 370 . . . communication device.

The invention claimed is:

1. A management apparatus comprising:
circuitry configured to
determine whether at least one application program is in operation in a specific state at a terminal apparatus connected to a network, the at least one application program being a target for control of a quality of service for communication in the network, and the specific state is a state in which the application program is operating in a foreground of the terminal apparatus; and
execute processing to terminate the control of the quality of the service for the terminal apparatus based on a result of determination being negative,
wherein the circuitry is configured to:
acquire terminal information transmitted at predetermined intervals of a first time period of time from the terminal apparatus at which the at least one application program is in operation in the specific state,
determine that transmission of the terminal information has stopped based on next terminal information not being acquired from the terminal apparatus after a second period of time has elapsed since a time at which the terminal information was acquired, wherein the second period of time is greater than the first period of time, and
determine, based on transmission of the terminal information having stopped, that none of the at least one application program is in operation in the specific state.

2. The management apparatus according to claim 1, wherein the terminal information is transmitted in such a manner that the terminal information is distinguishable from information transmitted from the terminal apparatus in a case in which none of the at least one application program is in operation in the specific state.

3. The management apparatus according to claim 1, wherein
the at least one application program comprises a plurality of application programs, and
the circuitry is configured to, in a case in which the plurality of application programs is in operation in the specific state at the terminal apparatus, select, based on the terminal information, control of the quality of the service for one application program of the plurality of application programs as the control of the quality of the service for the terminal apparatus.

4. The management apparatus according to claim 1, wherein:
the control of the quality of the service is executed by an external system, and
the circuitry is configured to request the external system to terminate the control of the quality of the service for the terminal apparatus to terminate the control of the quality of the service for the terminal apparatus.

5. The management apparatus according to claim 4, wherein:
the external system includes a plurality of quality control apparatuses configured to execute the control of the quality of the service, and
the circuitry is configured to:
specify, based on the result of the determination being negative, a quality control apparatus executing the control of the quality of the service for the terminal apparatus from among the plurality of quality control apparatuses; and request the specified quality control apparatus to terminate the control of the quality of the service for the terminal apparatus.

6. The management apparatus according to claim 5, wherein:
a quality control apparatus to execute the control of the quality of the service for the terminal apparatus is selected from among the plurality of quality control apparatuses based on a location of the terminal apparatus,
the circuitry is configured to
determine, based on the location of the terminal apparatus, whether the quality control apparatus executing the control of the quality of the service for the terminal apparatus has switched from a first quality control apparatus to a second quality control apparatus from among the plurality of quality control apparatuses, and
request the first quality control apparatus to terminate the control of the quality of the service for the terminal apparatus based on determining that the quality control apparatus executing the control of the quality of the service for the terminal apparatus has switched from the first quality control apparatus to the second quality control apparatus.

7. The management apparatus according to claim 1, wherein the terminal information is transmitted in such a manner that the terminal information is distinguishable from information transmitted from the terminal apparatus in a case in which none of the at least one application program is in operation in the specific state.

8. A network system comprising:
a terminal apparatus connected to a network; and
a management apparatus communicable with the terminal apparatus, wherein:
the terminal apparatus comprises circuitry configured to transmit terminal information to the management apparatus at predetermined intervals of a first period of time in which an operating state of an application program is a specific state, the application program being a target for control of a quality of service for communication in the network, and the specific state is a state in which the application program is operating in a foreground of the terminal apparatus,
the management apparatus comprises circuitry configured to:
determine that transmission of the terminal information has stopped based on next terminal information not being acquired from the terminal apparatus after a second period of time has elapsed since a time at which the terminal information was acquired, wherein the second period of time is greater than the first period of time, and
execute, based on determining that transmission of the terminal information having stopped, processing to terminate the control of the quality of the service for the terminal apparatus.

9. A terminal apparatus comprising:
circuitry configured to
request, when at least one application program that is a target for control of a quality of service for communication starts operating in a specific state, a quality control system to start the control of the quality of the service, and
transmit terminal information to the quality control system at predetermined intervals of a first period of time in which the at least one application program is in operation in the specific state,
wherein processing to terminate the control of the quality of the service for the terminal apparatus is executed at the quality control system when the terminal information is not acquired by the quality control system after a second period of time has elapsed since a time at which the terminal information was acquired, wherein the second period of time is greater than the first period of time.

* * * * *